US012042939B2

(12) United States Patent
Ingram et al.

(10) Patent No.: US 12,042,939 B2
(45) Date of Patent: Jul. 23, 2024

(54) END EFFECTOR COMPENSATION OF A ROBOTIC SYSTEM

(71) Applicant: The Boeing Company, Chicago, IL (US)

(72) Inventors: Luke C Ingram, Summerville, SC (US); Anthony W Baker, Gilbertsville, PA (US); Steven A Dorris, Hazelwood, MO (US)

(73) Assignee: The Boeing Company, Arlington, VA (US)

( * ) Notice: Subject to any disclaimer, the term of this patent is extended or adjusted under 35 U.S.C. 154(b) by 197 days.

(21) Appl. No.: 17/506,582

(22) Filed: Oct. 20, 2021

(65) Prior Publication Data

US 2022/0193903 A1 Jun. 23, 2022

Related U.S. Application Data

(60) Provisional application No. 63/127,646, filed on Dec. 18, 2020.

(51) Int. Cl.
*B25J 9/16* (2006.01)
*B25J 13/08* (2006.01)

(52) U.S. Cl.
CPC ............. *B25J 9/1664* (2013.01); *B25J 13/08* (2013.01)

(58) Field of Classification Search
CPC .................. B25J 9/1664; B25J 13/08; G05B 2219/40387
See application file for complete search history.

(56) References Cited

U.S. PATENT DOCUMENTS

| | | | |
|---|---|---|---|
| 2020/0269340 A1* | 8/2020 | Tang | G06V 10/145 |
| 2021/0370509 A1* | 12/2021 | Pivac | G05B 19/4155 |
| 2022/0079692 A1* | 3/2022 | Staunton | A61B 34/30 |
| 2022/0134574 A1* | 5/2022 | Provenaz | B25J 9/1684 |
| | | | 427/427.2 |
| 2023/0068121 A1* | 3/2023 | Lindeman | A61B 34/25 |

* cited by examiner

*Primary Examiner* — Adam R Mott
*Assistant Examiner* — Matthew C Gammon
(74) *Attorney, Agent, or Firm* — Duft & Bornsen, PC

(57) ABSTRACT

One embodiment comprises a method of operating a robotic system. The method comprises defining a Tool Center Point (TCP) for an end effector of the robotic system, providing a primary control plan that defines a tool path for the end effector, where the tool path has a plurality of pre-defined TCP positions. The method further comprises providing a secondary control plan that defines operation of the end effector at the plurality of pre-defined TCP positions, and determining a deviation between a pre-defined TCP position of the end effector and an actual TCP position of the end effector during implementation of the primary control plan by the robotic system. The method further comprises modifying the secondary control plan for the end effector based on the deviation during the implementation of the primary control plan by the robotic system.

23 Claims, 21 Drawing Sheets

SIDE

FRONT

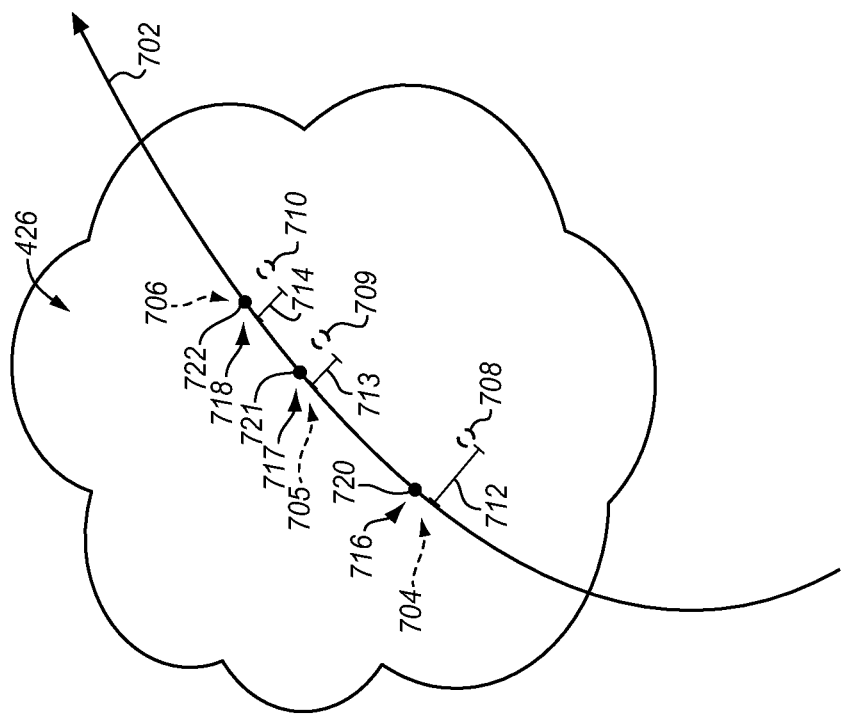
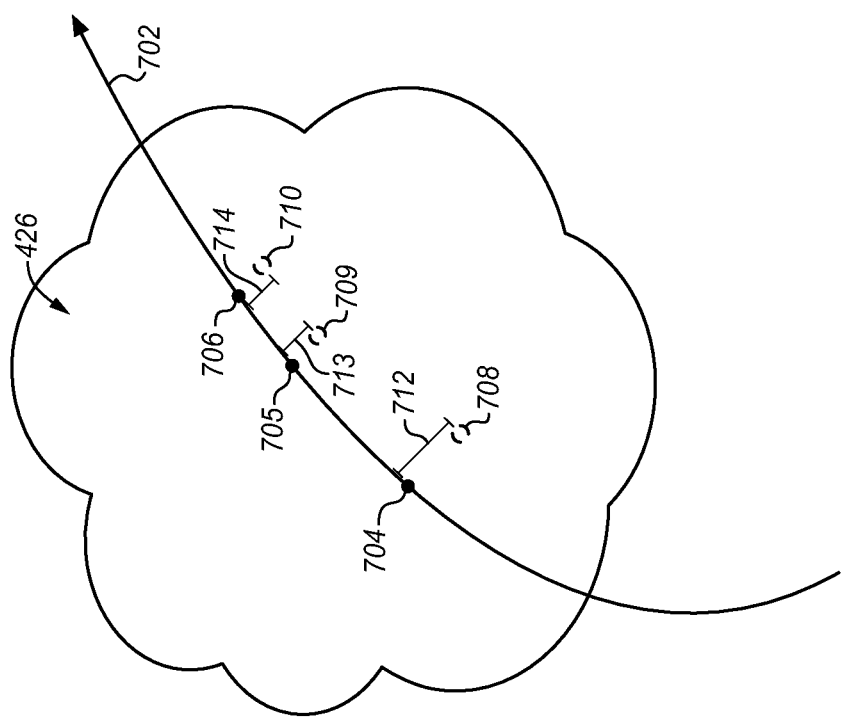

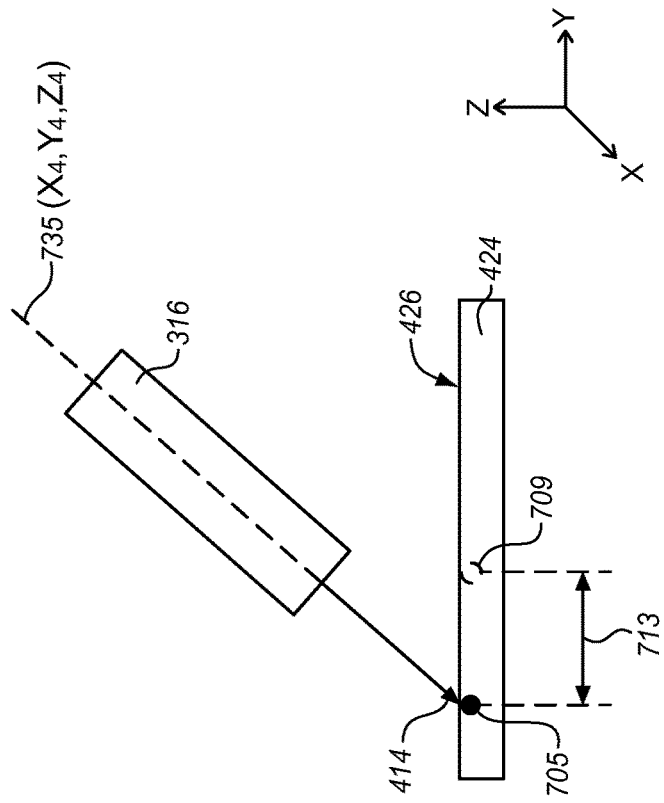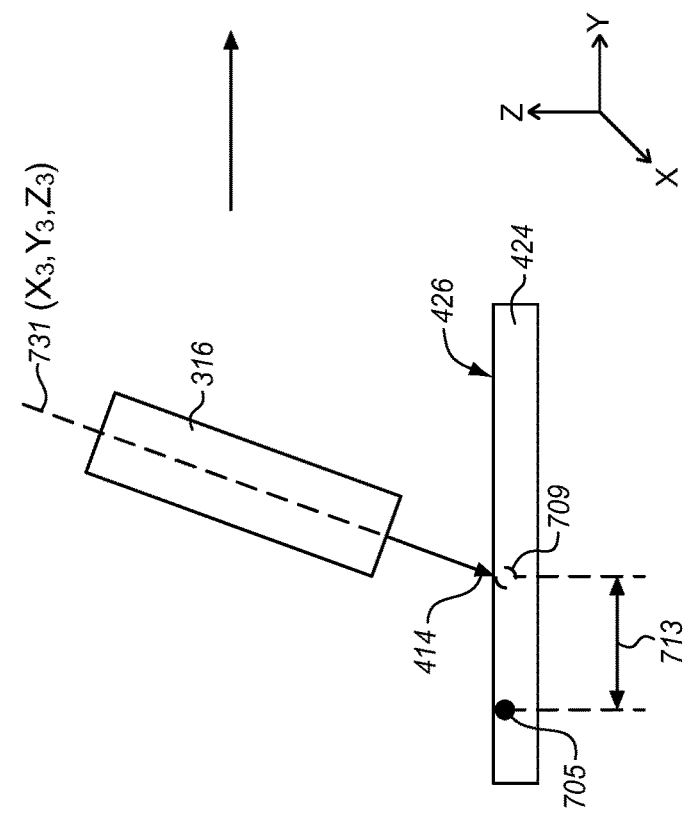

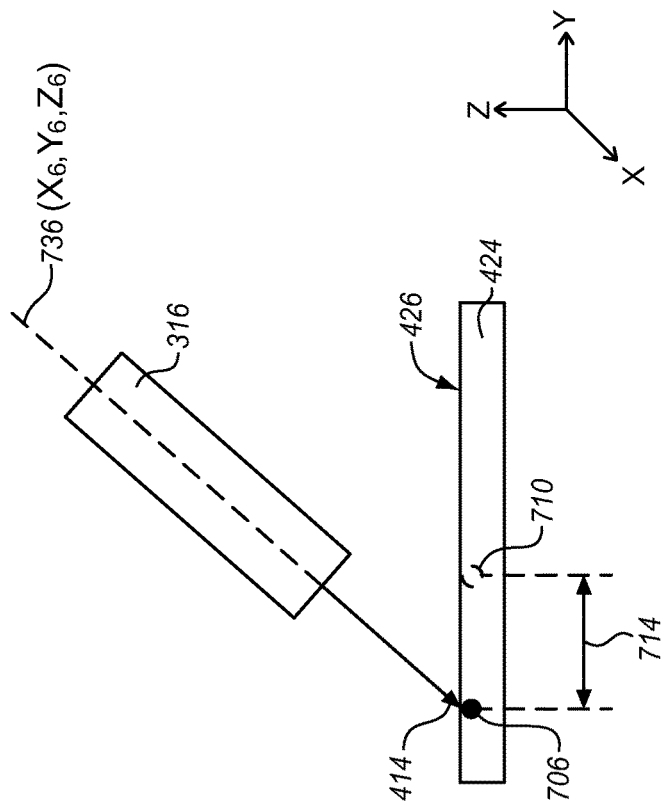
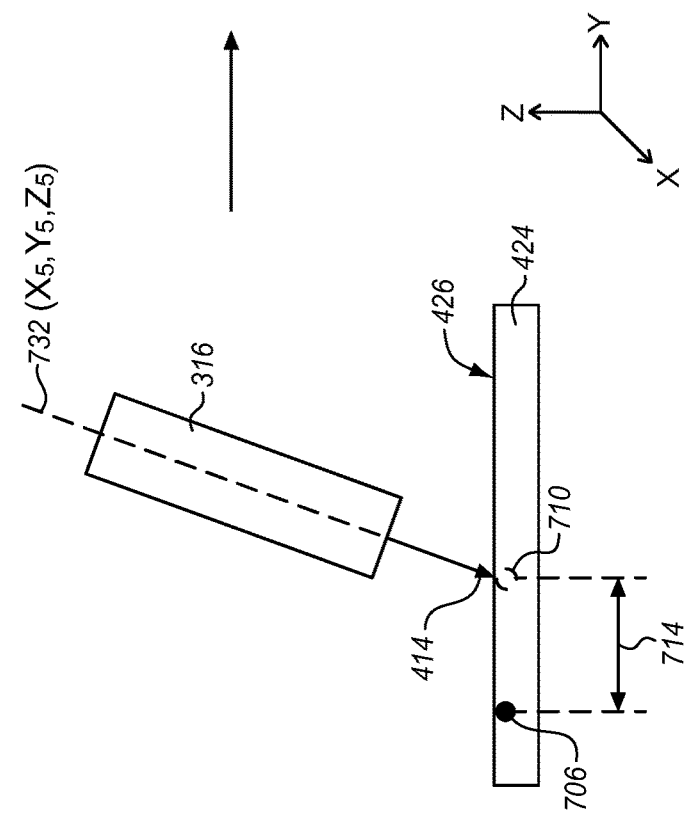

END EFFECTOR COMPENSATION OF A ROBOTIC SYSTEM

RELATED APPLICATIONS

This non-provisional patent application claims priority to U.S. Provisional Patent Application No. 63/127,646 filed on Dec. 18, 2020, which is incorporated by reference as if fully provided herein.

FIELD

This disclosure relates to the field of manufacturing, and in particular, to robotic tools used in manufacturing.

BACKGROUND

Traditional robotic systems used in manufacturing may include one or more multi-axis arms having one or more tools disposed thereon that perform machining processes on a workpiece. These robotic systems typically utilize a tool frame of reference (e.g., a Tool Center Point (TCP) coordinate systems) that defines where the tool is spatially located in its manufacturing environment. A path of the tool may then be planned in the manufacturing environment using a sequence of six Degrees Of Freedom (6DOF) TCP commands comprising both a position of the tool and an orientation of the tool. These TCP commands are implemented by a primary control system of the robotic systems, which mobilize their multi-axis joints to implement the TCP commands to position and orient their tools.

Because these robotic systems are mechanical in nature, their implementation of the TCP commands for tool placement results in a less than ideal accuracy during manufacturing. In order to compensate for their inaccuracies when implementing the TCP commands, various processes use high-accuracy measurement systems (e.g., laser trackers) to build static compensations tables that are used by the primary control systems to compensate their joint motions. These static compensation tables are useful for mitigating some, but not all, of the deviation between the expected tool position based on the sequence of TCP commands implemented by a robotic system, and the actual tool position.

These positional deviations generate variations in how a workpiece is machined, which may be greater than an allowable tolerance. For example, a drill tool may drill a hole in the workpiece at a position that is offset from the expected location on the workpiece, even when using the static compensation tables to compensate the joint motions of the robot.

Thus, it is desirable to further improve the accuracy of tool placement during a manufacturing process.

SUMMARY

In the embodiments described herein, a robotic system executes a primary control plan that defines a tool path for tool. The tool path includes a plurality of planned TCP positions where the tool will perform work on a workpiece, such as an aircraft fuselage. The robotic system further executes a secondary control plan that defines the operations that the tool will perform at the planned TCP positions along the tool path. Because of the inaccuracies inherent in tool placement in the robotic system, in practice, a deviation between the planned TCP position of the tool and an actual TCP position of the tool can exist. The deviation is determined, and the secondary control plan for the tool is modified to mitigate the deviation. For example, if the tool is a drill, then the secondary control plan may be modified independently of the primary control plan to adjust the orientation of the drill bit based on the deviation. Modifying the secondary control plan based on the deviation provides a technical benefit of improving the accuracy of various manufacturing processes.

One embodiment comprises a method of operating a robotic system. The method comprises defining a Tool Center Point (TCP) for an end effector of the robotic system, and providing a primary control plan that defines a tool path for the end effector, where the tool path has a plurality of pre-defined TCP positions. The method further comprises providing a secondary control plan that defines operation of the end effector at the plurality of pre-defined TCP positions, and determining a deviation between a pre-defined TCP position of the end effector and an actual TCP position of the end effector during implementation of the primary control plan by the robotic system. The method further comprises modifying the secondary control plan for the end effector based on the deviation during the implementation of the primary control plan by the robotic system.

Another embodiment comprises a robotic system that includes an end effector and at least one controller. The end effector has a Tool Center Point (TCP). The at least one controller implements a primary control plan that defines a tool path for the end effector, where the tool path includes a plurality of pre-defined TCP positions. The at least one controller implements a secondary control plan that defines operation of the end effector at the pre-defined TCP positions, and determines a deviation between a pre-defined TCP position of the end effector and an actual TCP position of the end effector during implementation of the primary control plan by the robotic system. The at least one controller modifies the secondary control plan for the end effector based on the deviation during the implementation of the primary control plan by the robotic system.

Another embodiment comprises a non-transitory computer-readable medium embodying programmed instructions which, when executed by at least one processor of a robotic system, directs the at least one processor to define a Tool Center Point (TCP) for an end effector of the robotic system, provide a primary control plan that defines a tool path for the end effector having a plurality of pre-defined TCP positions, provide a secondary control plan that defines operation of the end effector at the pre-defined TCP positions, and determine a deviation between a pre-defined TCP position of the end effector and an actual TCP position of the end effector during implementation of the primary control plan by the robotic system. The programmed instructions further direct the at least one processor to modify the secondary control plan for the end effector based on the deviation during the implementation of the primary control plan by the robotic system.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIG. 7A depicts a tool path for an end effector in an illustrative embodiment.

FIG. 7B depicts a tool path for an end effector in another illustrative embodiment.

FIGS. 7C-7H depict different orientations of an end effector relative to a surface of a workpiece in illustrative embodiments.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
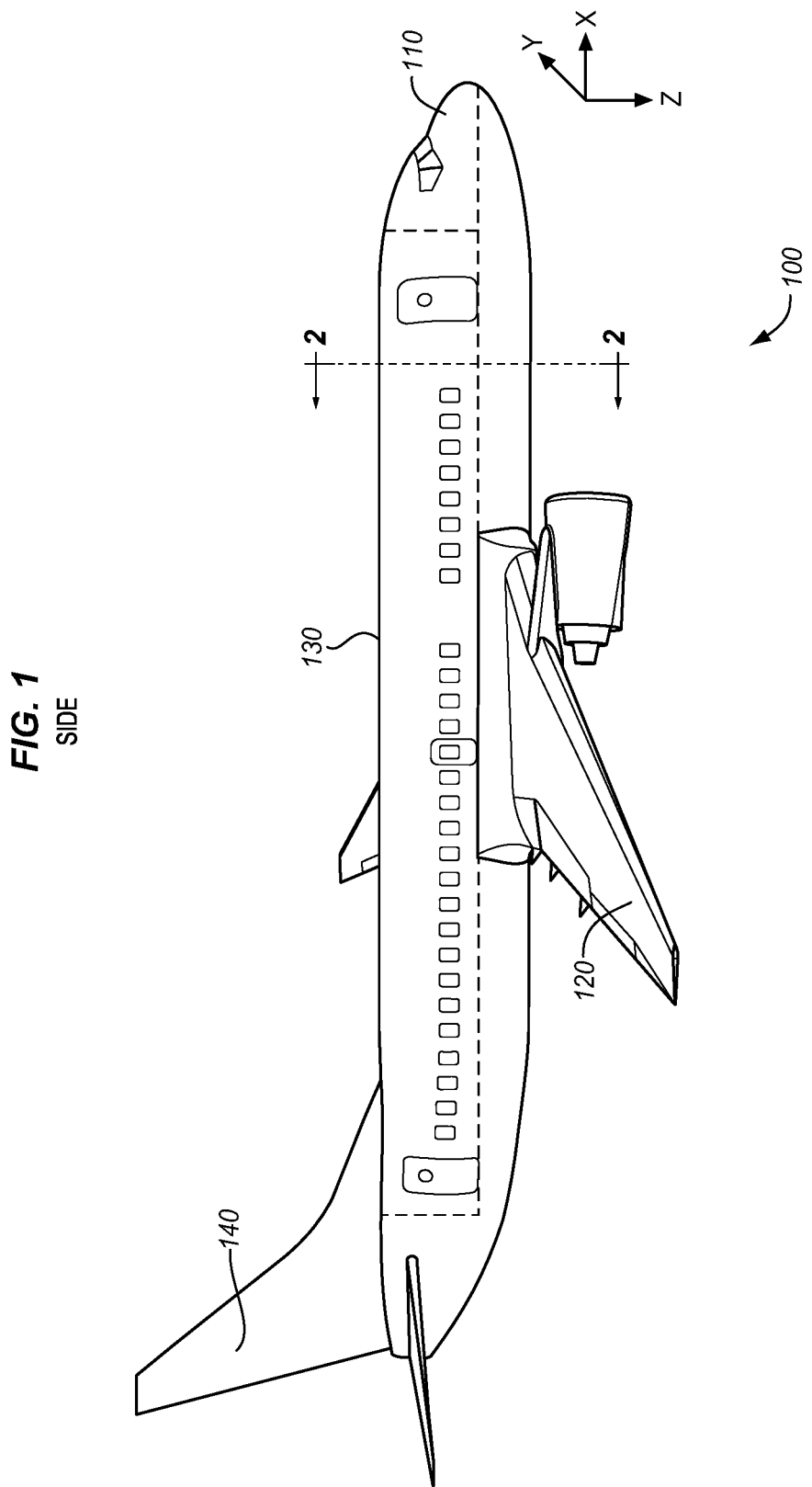
FIG. 1 depicts a side view of an aircraft in an illustrative embodiment.

FIG. 1 depicts a side view of an aircraft 100 in an illustrative embodiment. Aircraft 100 includes nose 110, wings 120, fuselage 130, and tail 140. FIG. 1 also illustrates a downward direction (Z) for aircraft 100. Although aircraft 100 has been depicted to have a particular configuration for purposes of discussion, aircraft 100 may have other configurations in other embodiments.

Figure 2:
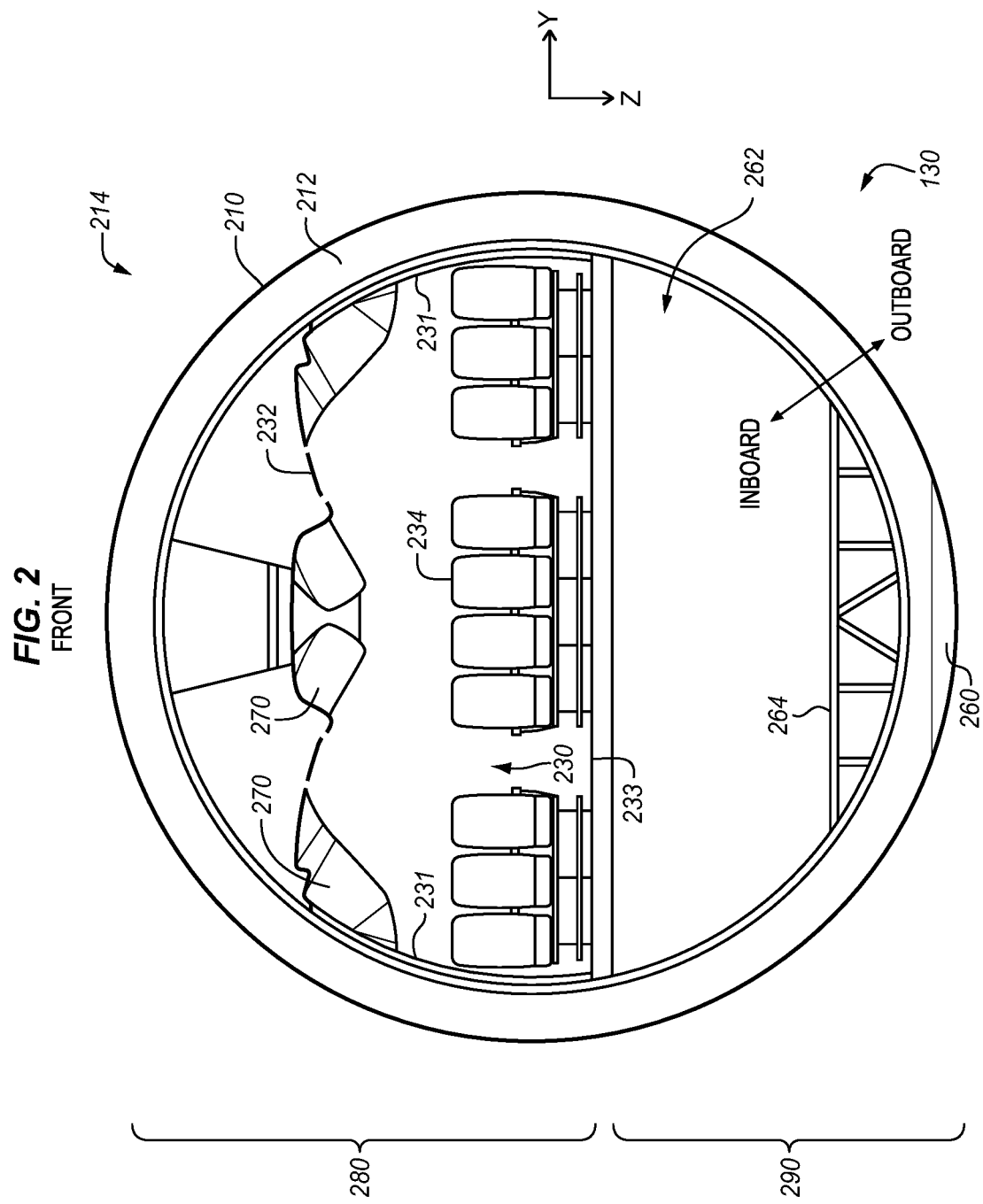
FIG. 2 depicts a cut-through front view of the aircraft corresponding to view arrows 2 in FIG. 1 in an illustrative embodiment.

FIG. 2 depicts a cut-through front view of aircraft 100 corresponding to view arrows 2 in FIG. 1 in an illustrative embodiment. In particular, FIG. 2 illustrates a cross sectional view of fuselage 130 for aircraft 100. Fuselage 130 includes an upper section 280, which includes a floor 233, a ceiling 232, and sidewalls 231 that form a cabin 230. Support members 212 (e.g., comprising hoop wise frames and longitudinally elongated stringers) enforce the shape of fuselage 130 and provide structural support. In this embodiment, seating 234 and storage 270 are also included. Fuselage 130 also includes a lower section 290, which includes drainage 260 located beneath cargo floor 264 of cargo area 262. FIG. 2 further illustrates that an outboard direction that proceeds towards skin 210 of aircraft 100, and an inboard direction that proceeds towards the interior (e.g., cabin 230) of aircraft 100. As shown in FIG. 2, skin 210 surrounds fuselage 130 and forms a surface 214 of fuselage 130.

Figure 3:
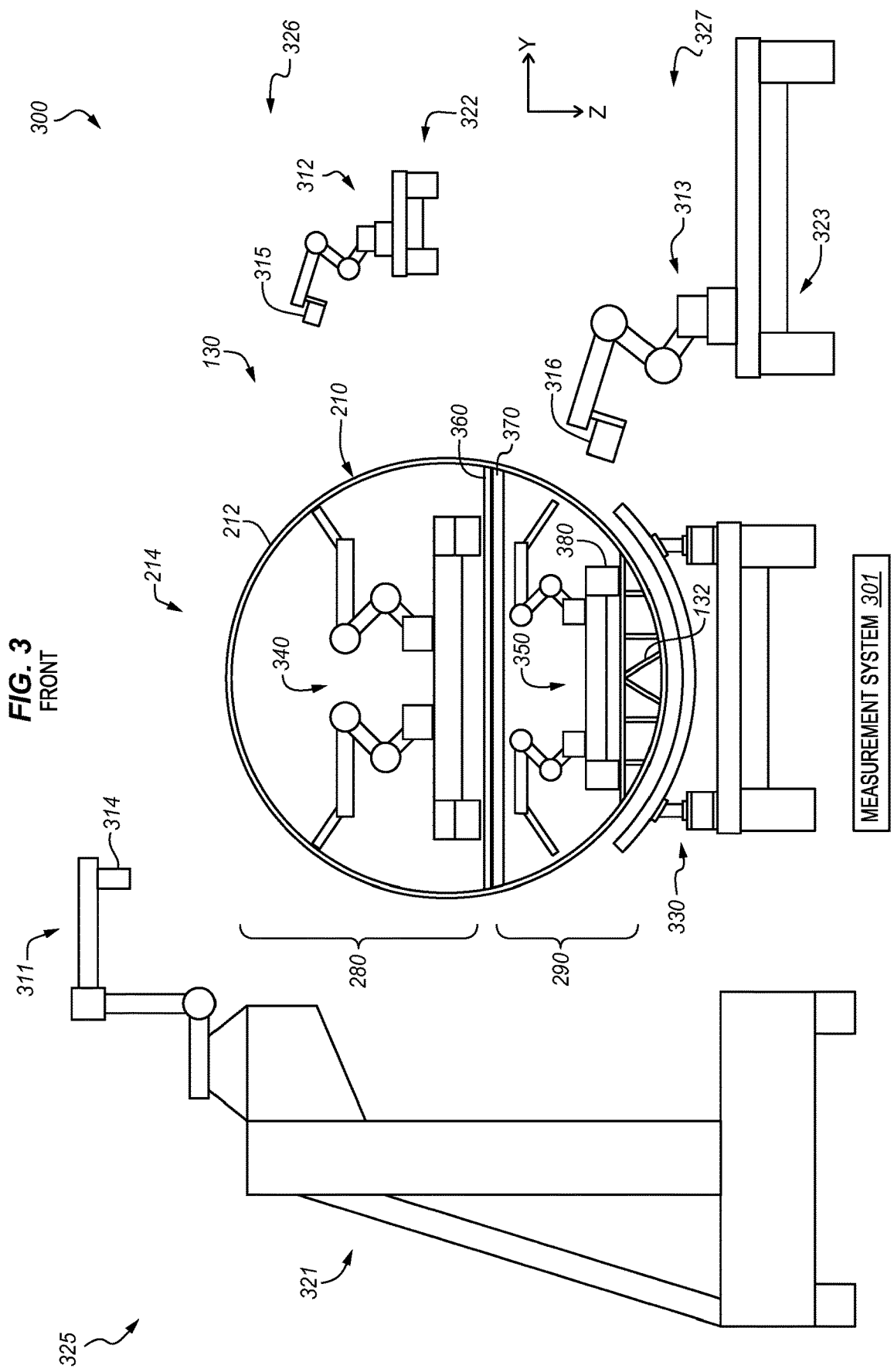
FIG. 3 is a front view of a manufacturing environment for a portion of a fuselage in an illustrative embodiment.
Figure 4A:
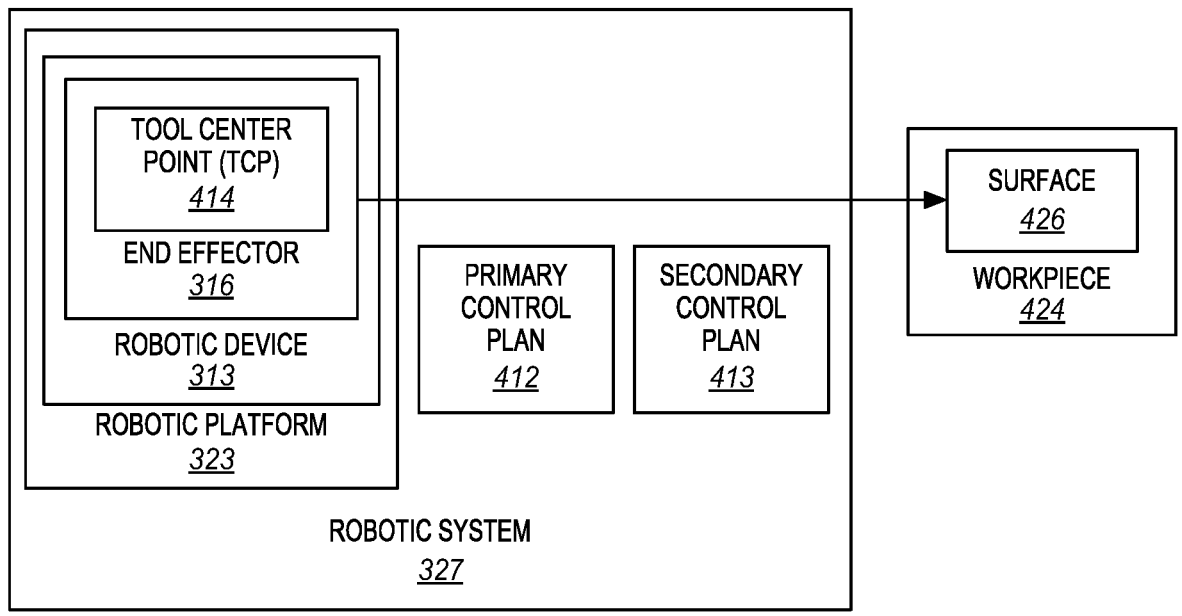
FIGS. 4A-4F are block diagrams of a robotic system in the manufacturing environment of FIG. 3 in illustrative embodiments.
Figure 4B:
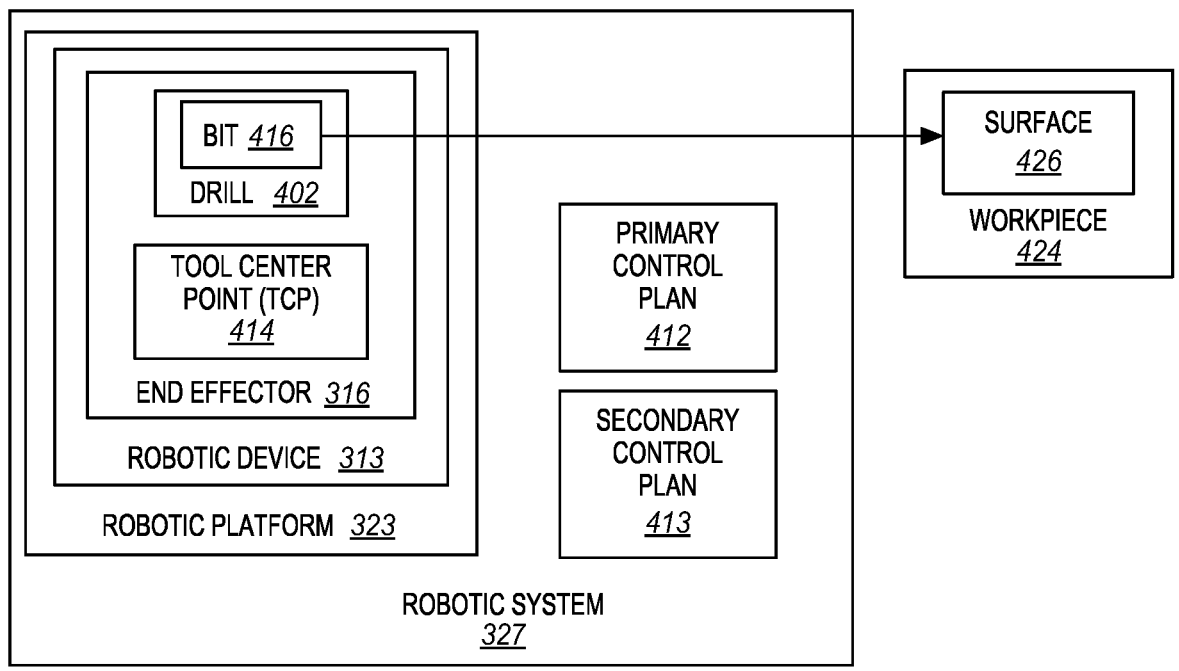
Figure 4C:
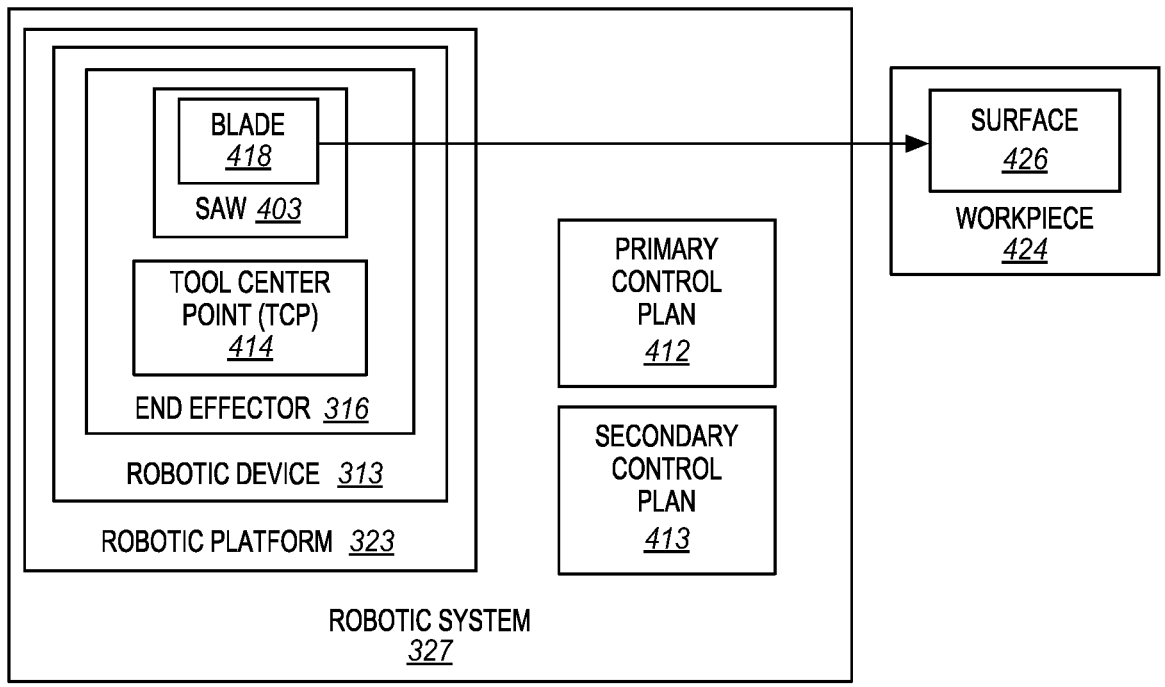
Figure 4D:
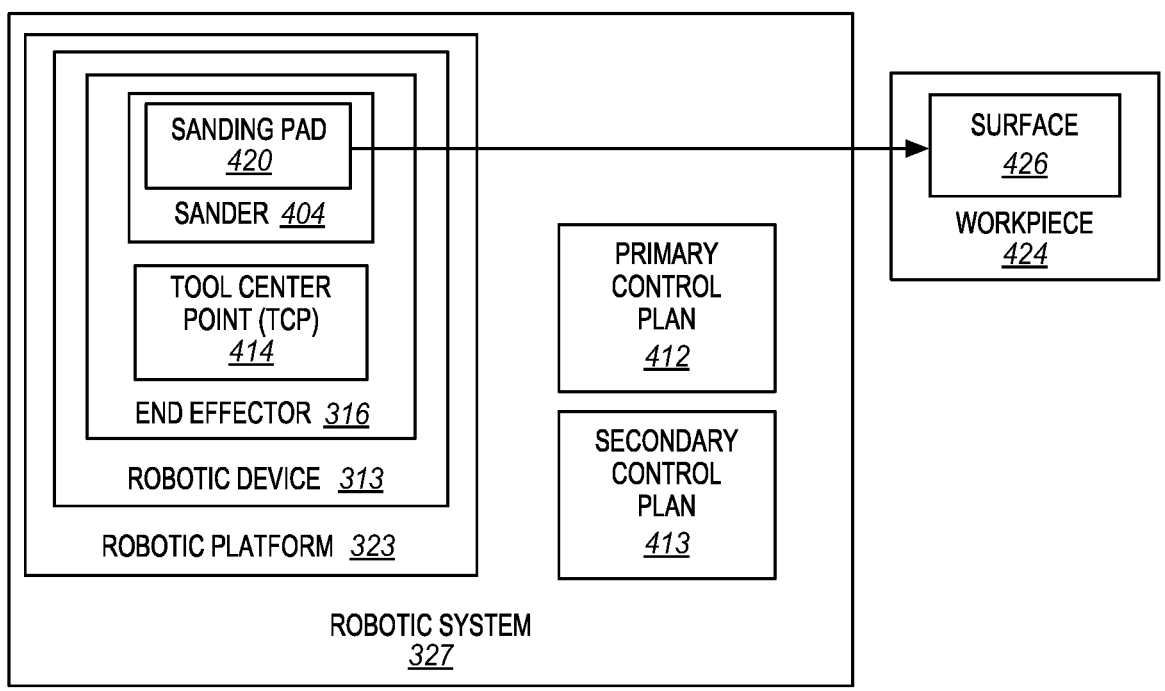
Figure 4E:
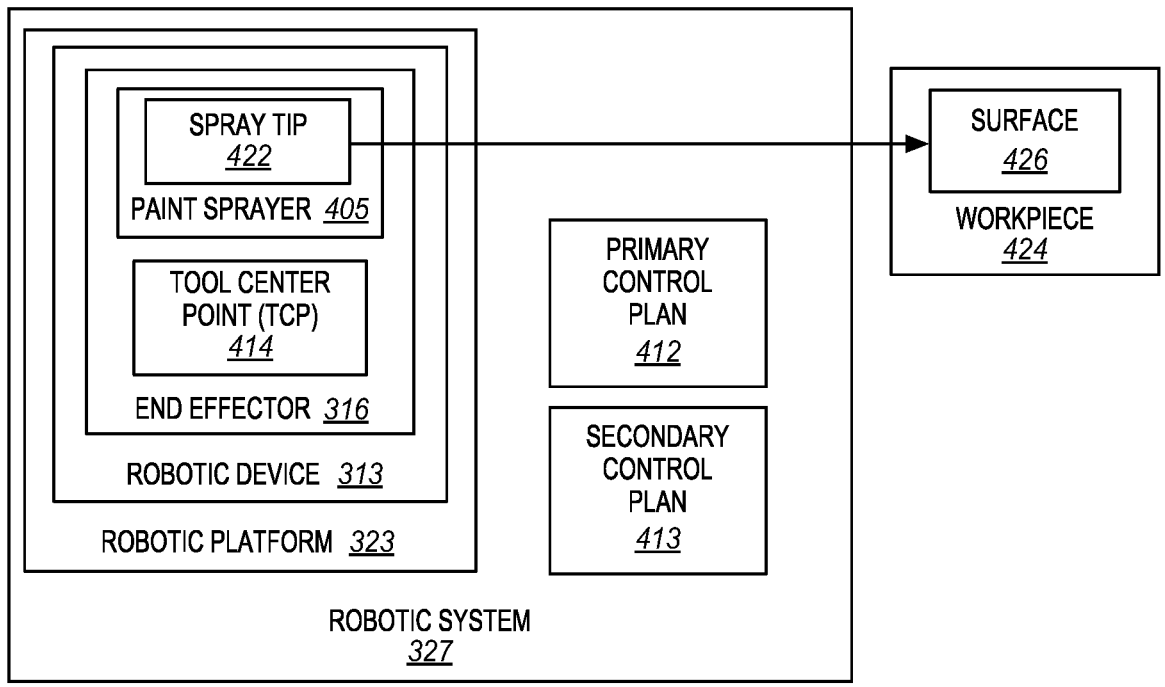
Figure 4F:
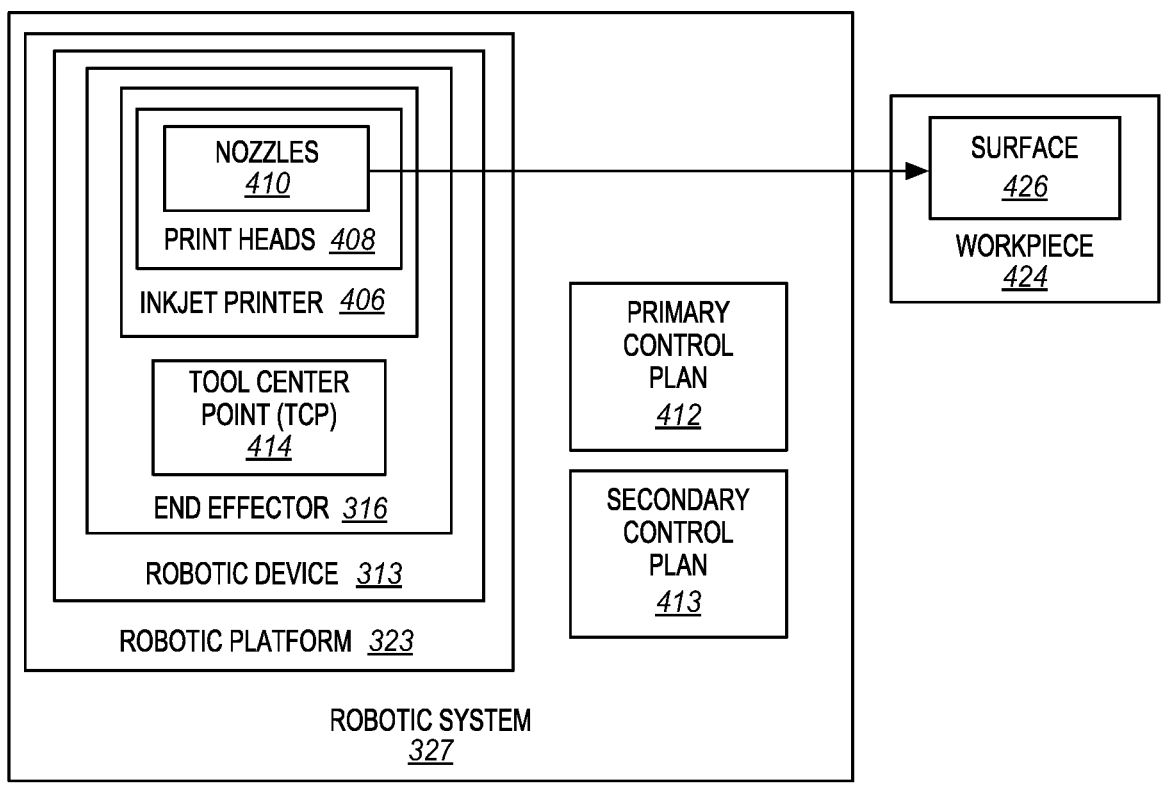

FIG. 3 is a front view of a manufacturing environment 300 for a portion of fuselage 130 in an illustrative embodiment. FIG. 3 illustrates the same view of fuselage 130 as FIG. 2, but represents the environment in which fuselage 130 is fabricated and/or painted. Further, although manufacturing environment 300 is described with respect to fabricating and/or painting fuselage 130, the discussion of manufacturing environment 300 equally applies to fabricating and/or painting any component, sub-assembly, or structure generally referred to as a workpiece, such as a surface of a workpiece. Therefore, the terms "fuselage" and "workpiece" may be used interchangeably in this disclosure.

In this embodiment, fuselage 130 is mounted onto cradle 330. Manufacturing environment 300 in this embodiment further includes robotic systems 325-327. Robotic systems 325-327 include robotic devices 311-313, respectively, which are mounted to robotic platforms 321-323, respectively. Robotic platforms 321-323 may, for example, include various mobile and semi-mobile assemblies that may be used to reposition robotic devices 311-313.

Robotic devices 311-313 include end effectors 314-316, respectively, which are used during the fabrication and/or painting process for a workpiece, such as fuselage 130.

FIGS. 4A-4F are block diagrams of robotic system 327 of manufacturing environment 300 in illustrative embodiments. Although FIGS. 4A-4F will be described with respect to robotic system 327, the discussion of FIGS. 4A-4F applies equally to other robotic systems that may be included in manufacturing environment 300, such as robotic systems 325-326.

In this embodiment, robotic system 327 comprises any system, component, or device that performs machining processes and/or painting processes on a workpiece 424 and/or a surface 426 of workpiece 424 utilizing its end effector 316. One non-limiting example of workpiece 424 is fuselage 130. Any number of tools may be associated with end effector 316. The tools associated with end effector 316 may include, for example, a drill 402 (see FIG. 4B). Generally, drill 402 includes one or more drill bits 416, for performing drilling operations on workpiece 424, saw 403 (see FIG. 4C) includes one or more blades 418 for performing cutting operations on workpiece 424, and sander 404 (see FIG. 4D) includes one or more sanding pads 420 for performing sanding operations on workpiece 424. End effector 316 may further include a paint sprayer 405 (see FIG. 4E), which may apply paint to workpiece 424 utilizing a spray tip 422, and an inkjet printer 406 (see FIG. 4F). Generally, inkjet printer 406 include one or more print heads 408, which include nozzles 410 that eject droplets of ink towards workpiece 424 (e.g., fuselage 130) during a painting process. Each print head 408 may be associated with a different colorant, depending on the type of painting process being performed (e.g., painting color images versus painting monochromatic images). Nozzles 410 may be individually actuated and/or may discharge varying amounts of colorant based on the bitmap data used to represent the desired image to be painted onto workpiece 424.

Referring to FIG. 3, robotic system 327 may traverse fuselage 130 as desired in order to perform work on fuselage 130. Robotic device 313 and robotic platform 323 of robotic system 327 may coordinate their actions with mobile tracked robot assemblies 340 and 350 within fuselage 130, in order to engage in fabrication operations that assemble fuselage 130 and/or affix skin 210 to support members 212 of fuselage 130. Robot assembly 340 performs work within upper section 280 of fuselage 130, while robot assembly 350 performs work within lower section 290 of fuselage 130. Furthermore, robot assembly 340 moves across a temporary floor 360 in upper section 280, which is mounted to joists 370. Robot assembly 350 moves across temporary floor 380 in lower section 290, which is mounted to structure 132.

During the manufacturing process, robotic system 327 may move autonomously to perform the steps used to fabricate and/or paint workpiece 424 under direction of a primary control plan 412 (see FIGS. 4A-4F), which defines a sequence of Tool Center Point (TCP) commands that robotic system 327 executes to reposition and orient its end effector 316 at different pre-defined TCP positions within manufacturing environment 300. For instance, the pre-defined TCP positions may correspond to a tool center point 414 (TCP) of end effector 316. Robotic system 327 may further utilize a secondary control plan 413 (see FIGS. 4A-4F) that defines the operation of its end effector 316 at those pre-defined TCP positions.

For example, the primary control plan 412 may define a first sequence of TCP commands that directs robotic device 313 to position TCP 414 of its drill 402 at a pre-defined TCP position proximate to surface 426 of workpiece 424 (see FIG. 4B) for a drilling operation. With the drill 402 at the pre-defined TCP position, secondary control plan 413 directs robotic device 313 to power up its drill 402 and perform the drilling operation on surface 426. Subsequent TCP commands in primary control plan 412 may then control robotic device 313 to reposition its drill 402 as part of the drilling process (e.g., to move drill 402 towards surface 426 to drill a hole). Either the completion of the first set of TCP commands or the execution of the second set of TCP commands may trigger the secondary control plan 413 to operate drill 402. For instance, specific TCP commands or sequences of TCP commands in primary control plan 412 are linked to and/or trigger activities performed in secondary control plan 413.

As discussed previously, the implementation of the TCP commands by robotic system 327, even with the use of static compensation tables, typically results in some amount of deviation between the pre-defined TCP positions of end effector 316 and the actual TCP positions of end effector 316. This deviation may be measured by a measurement system 301 that operates within manufacturing environment 300. Measurement system 301 may include, for example, one or more laser ranging devices which measures distances to reflective targets mounted to robotic platform 323, robotic device 313, end effector 316, or combinations thereof. Such measurements may be used to determine the TCP positional deviations previously described, and the deviations are used to modify secondary control plan 413. In particular, the TCP position deviations measured by measurement system 301 between the pre-defined TCP positions specified in primary control plan 412 for TCP 414 of end effector 316 and the actual TCP positions of TCP 414 of end effector 316 are used to modify secondary control plan 413 that operates end effector 316. These modifications may be performed on secondary control plan 413 rather than primary control plan 412. For example, end effector 316 may include some limited capability in positioning or orientation that is controlled by secondary control plan 413 and is independent of primary control plan 412, which may be used to mitigate the TCP deviations by, for example, varying an orientation of a drill, saw, sander, or painter.

While it may be more intuitive to modify the TCP command sequence being implemented in primary control plan 412 in order to mitigate the TCP position deviations described above, it may not be possible to do so. For example, the real-time TCP command sequences being processed in primary control plans 412 of robotic systems 327 are often generated by translating the desired real-world TCP motions into a complex set of multi-axis joint movements that are computationally difficult to generate on-the-fly. Therefore, the sequence of TCP commands being implemented are pre-defined for the work being performed on workpiece 424, and are typically not modified while they are being executed by robotic system 327. In another example of why it may not be possible to modify primary control plan 412 in order to mitigate the TCP position deviations, the TCP position deviations measured by measurement system 301 may be too small for correction by robotic system 327, such as when the deviations in the TCP positions of end effector 316 is smaller than the minimum positioning capability of robotic system 327.

Figure 5:
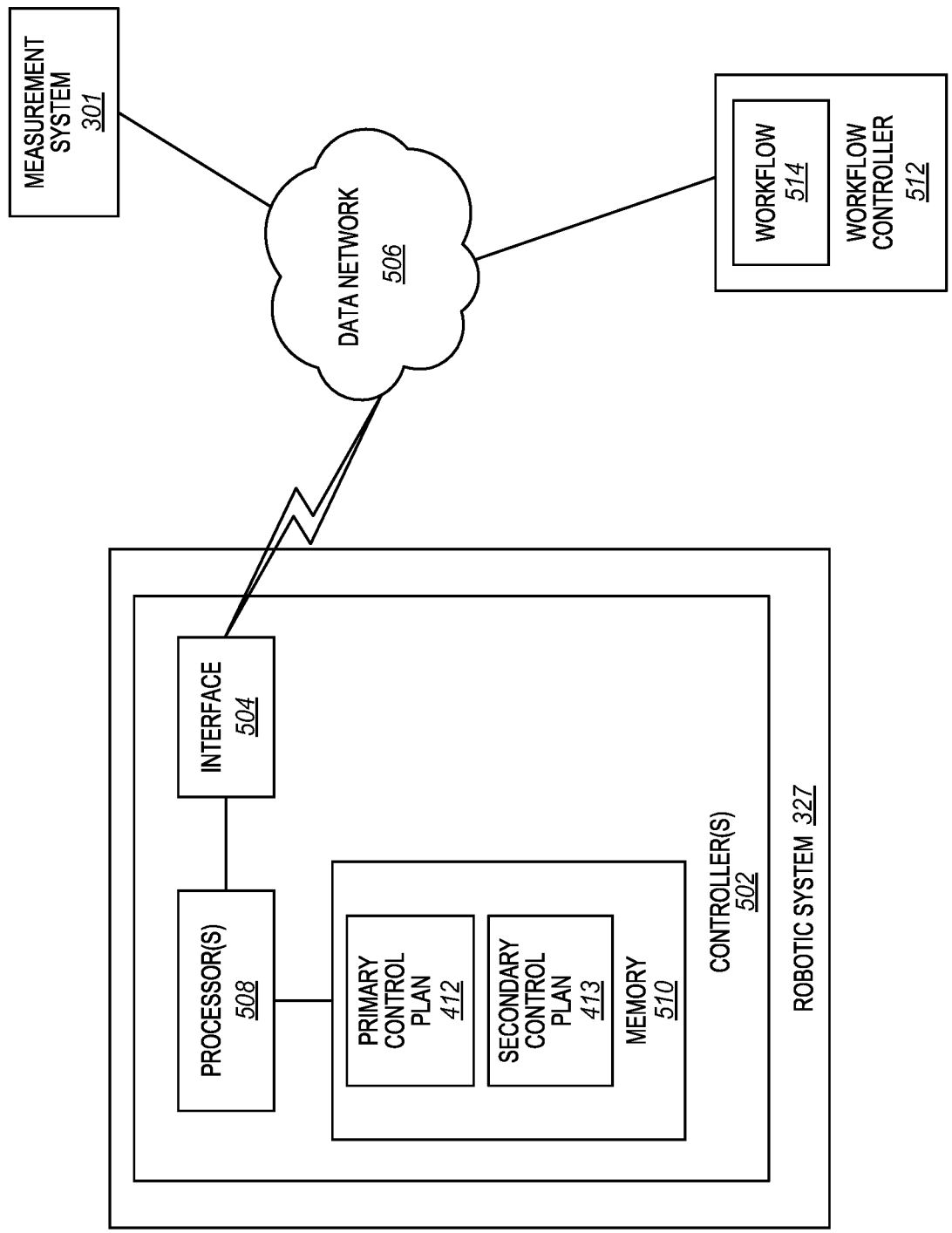
FIG. 5 is a block diagram of a controller in an illustrative embodiment.

FIG. 5 is a block diagram of one or more controllers 502 that may be used by robotic system 327 when implementing primary control plan 412 and/or the secondary control plan 413 in an illustrative embodiment. In this embodiment, controller 502 includes an interface 504, which communicatively couples controller 502 to measurement system 301 via a data network 506. Data network 506 may include any wired or wireless network as a matter of design choice. Some wired examples of interface 504 used by controller 502 to communicate with data network 506 include Ethernet, including Power over Ethernet (POE) implementations, Universal Serial Bus (USB), Fiber optic interfaces, etc. Some wireless examples of interface 504 used by controller 502 to communicate with data network 506 include IEEE 802.11, IEEE 802.15.4, Bluetooth, etc.

While the specific hardware implementation of controller 502 is subject to design choices, one particular embodiment may include one or more processors 508 coupled with memory 510. Processor 508 includes any hardware device that is able to perform functions. Processor 508 may include one or more Central Processing Units (CPU), microprocessors, Digital Signal Processors (DSPs), Application-specific Integrated Circuits (ASICs), etc.

Memory 510 includes any hardware device that is able to store data. For instance, memory 510 may store primary control plan 412 and/or secondary control plan 413. Memory 510 may include one or more volatile or non-volatile Dynamic Random-Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM. A workflow controller 512 may be coupled to data network 506 in some embodiments, which may be used to generate primary control plan 412 and/or secondary control plan 413 based on a workflow 514 that describes the type of work to be performed on workpiece 424.

Consider that robotic system 327 is operational within manufacturing environment 300, and that robotic system 327 is tasked with performing fabrication and/or painting processes on workpiece 424.

Figure 6:
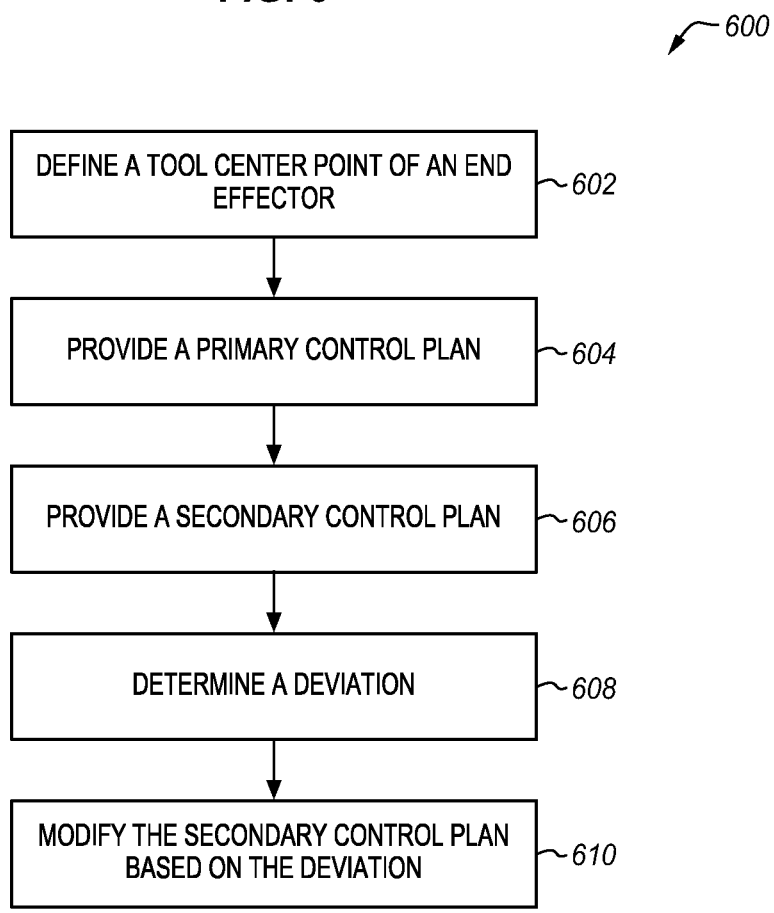
FIG. 6 is a flow chart of a method of operating a robotic system in an illustrative embodiment.
Figure 7D:
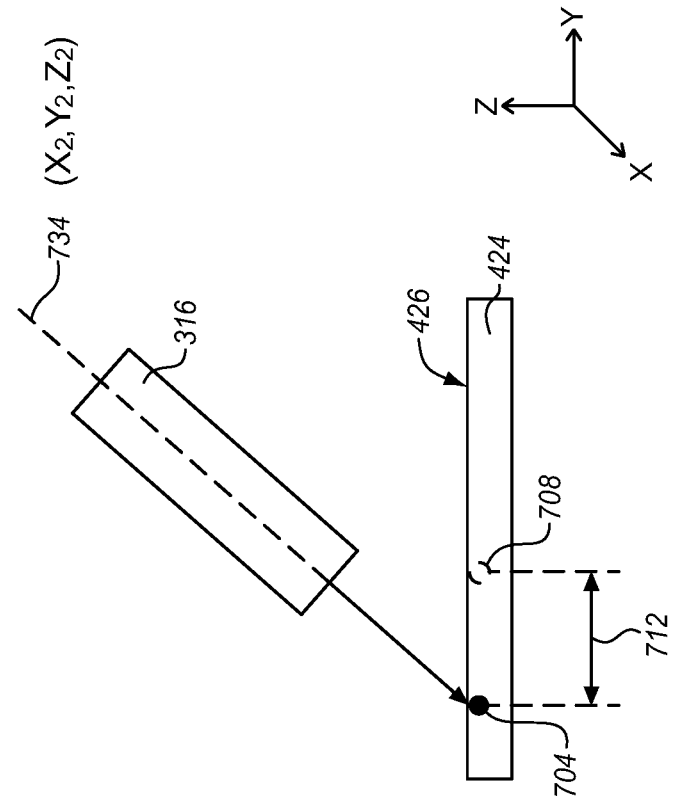

FIG. 6 is a flow chart of a method 600 of operating a robotic system in an illustrative embodiment. FIGS. 7A-7B depict a tool path 702 in illustrative embodiments, FIGS. 7C-7H depict end effector 316 at different orientations relative to surface 426 of workpiece 424, and FIGS. 8-18 are flow charts depicting additional details of method 600 in illustrative embodiments.

Method 600 will be described with respect to robotic system 327 and manufacturing environment 300, although method 600 may apply to other systems, not shown, including robotic systems 325-326. The steps of method 600 are not all inclusive, and may include other steps, not shown. Further, the steps may be performed in a different order.

Step 602 comprises defining TCP 414 for end effector 316. TCP 414 for end effector 316 may depend on the type of tool being used by robotic device 313. As described previously, end effector 316 may comprise a variety of different types of tools. Some of these tools will be described with respect to FIGS. 8-18.

Step 604 comprises providing primary control plan 412 that defines tool path 702 (see FIG. 7A) for TCP 414 of end effector 316. In this embodiment, tool path 702 includes pre-defined TCP positions 704-706 on surface 426 of workpiece 424 (e.g., surface 214 of fuselage 130). The location and number of pre-defined TCP positions 704-706 in tool path 702 are selected merely for purposes of discussion, and tool path 702 may include more or fewer pre-defined TCP positions 704-706 as desired. Primary control plan 412 may be provided to robotic system 327 over data network 506 by workflow controller 512, which may generate primary control plan 412 based on workflow 514.

Step 606 comprises providing secondary control plan 413 that defines the operation of end effector 316 at pre-defined TCP positions 704-706. Secondary control plan 413 may be provided to robotic system 327 over data network 506 by workflow controller 512, which may generate secondary control plan 413 based on workflow 514. Secondary control plan 413 defines operation of the end effector 316 at the pre-defined TCP positions. For instance, secondary control plan 413 can define particular operations of end effector 316, such as particular drilling operations (e.g., location of drilling, angle of drilling, etc.) or particular painting operations (e.g., nozzles to be activated, length of time of activation of nozzles, etc.). Other examples are possible as well.

Step 608 comprises determining a deviation between a pre-defined TCP position of end effector 316 and an actual TCP position of end effector 316 during implementation of primary control plan 412. Referring to FIG. 7A, tool path 702 defines the trajectory for TCP 414 of end effector 316, with pre-defined TCP positions 704-706 representing locations on surface 426 of workpiece 424 where a fabrication and/or painting process will be performed by end effector 316. As primary control plan 412 is executed by robotic system 327, robotic system 327 executes a sequence of TCP commands that move TCP 414 of end effector 316 along tool path 702 towards pre-defined TCP position 704, as tool path 702 has a direction indicated in FIG. 7A. When the TCP commands to position TCP 414 of end effector 316 at pre-defined TCP position 704 are completed, TCP 414 of end effector 316 may not be located exactly at pre-defined TCP position 704, but rather, may be located at an actual TCP position 708 that is offset from pre-defined TCP position 704 by a non-zero displacement represented by deviation 712. Deviation 712 may be measured by measurement system 301, and provided to robotic system 327 over data network 506. Deviations 712-714 may be 3-Dimensional (3-D) vectors in some embodiments that represent the 3-D offset between actual TCP positions 708-710 and pre-defined TCP positions 704-706.

Step 610 comprises modifying secondary control plan 413 for end effector 316 based on deviation 712. For example, secondary control plan 413 may specify a first set of operating characteristics for end effector 316, which are then modified based on the value(s) of deviation 712 to a different set of operating characteristics. The modifications to the operating characteristics of end effector 316 may be performed independently of primary control plan 412. Modifying secondary control plan 413 based on deviation 712 provides the technical benefit of improving the performance of robotic system 327 for fabrication and/or painting work.

FIGS. 8-19 depict additional details of method 600 in illustrative embodiments. With respect to FIG. 8, step 802 comprises operating end effector 316 according to the modified secondary control plan 413. In some embodiments, operating end effector 316 according to the modified secondary control plan 413 is performed while continuing to operate robotic system 327 according to primary control plan 412 (see step 902, FIG. 9). While method 600 has been described with respect to modifying secondary control plan 413, some embodiments modify both secondary control plan 413 and primary control plan 412 based on deviation 712 (see step 610 and step 1002 of FIG. 10). For example, modifying primary control plan 412 may entail adjusting the TCP commands in primary control plan 412, which may subsequently entail adjusting the commands in secondary control plan 413 based on those adjustments (the adjustments compound).

Generally, end effector 316 may include any number of tools, some of which have been described. An actual position of TCP 414 of such tools may depend, for example, on the tool itself. As primary control plan 412 is executed by robotic system 327, robotic system 327 executes a sequence of TCP commands that would ideally move TCP 414 of end effector 316 along tool path 702 towards pre-defined TCP position 704. However, due to the inaccuracies previously described, a deviation 712 exists between actual TCP position 708 and pre-defined TCP position 704, which is then used to modify secondary control plan 413 for end effector 316.

Figure 7C:
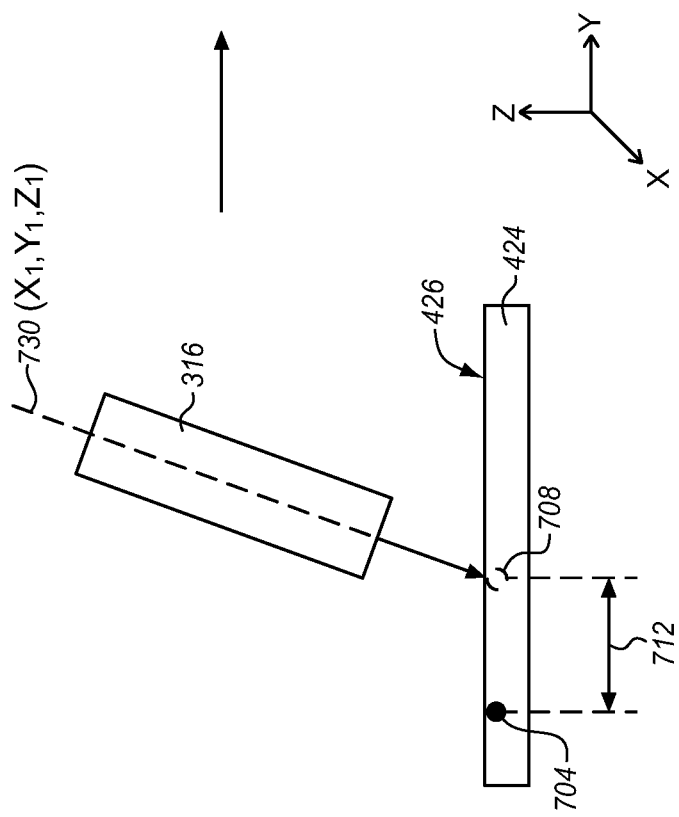
Figure 8:
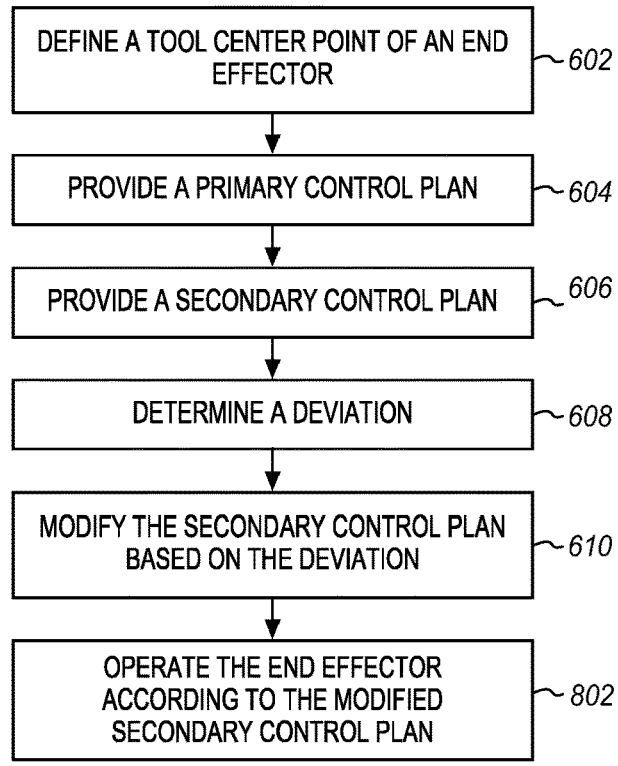
FIGS. 8-18 are flow charts depicting additional details of the method of FIG. 6 in illustrative embodiments.
Figure 9:
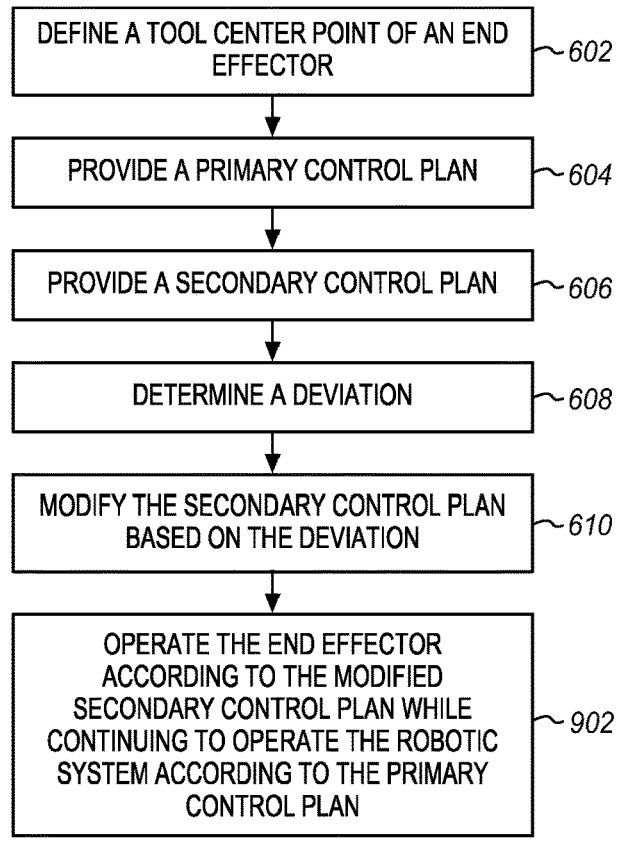
Figure 10:
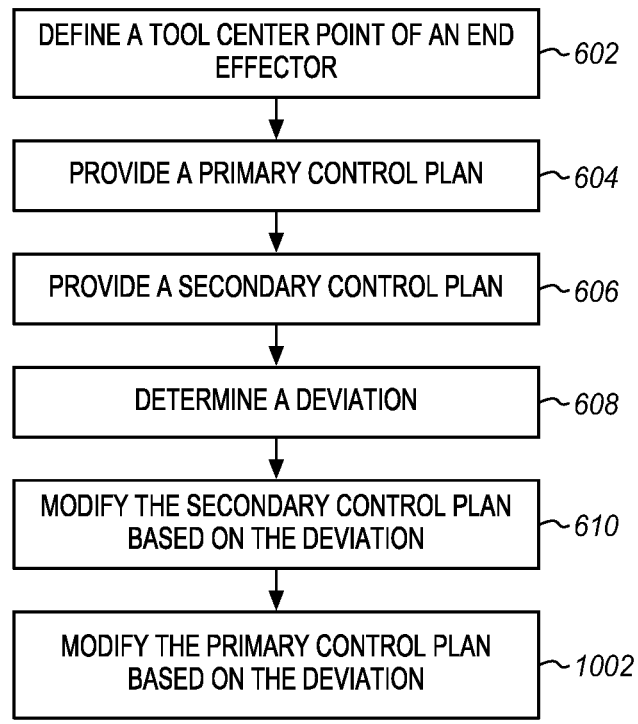
Figure 11:
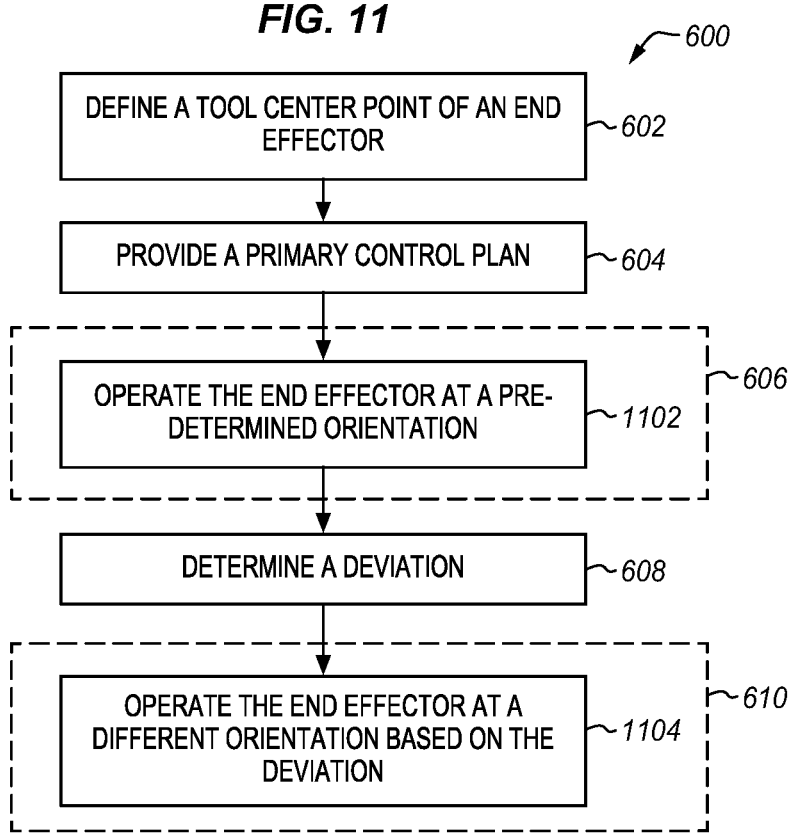
Figure 12:
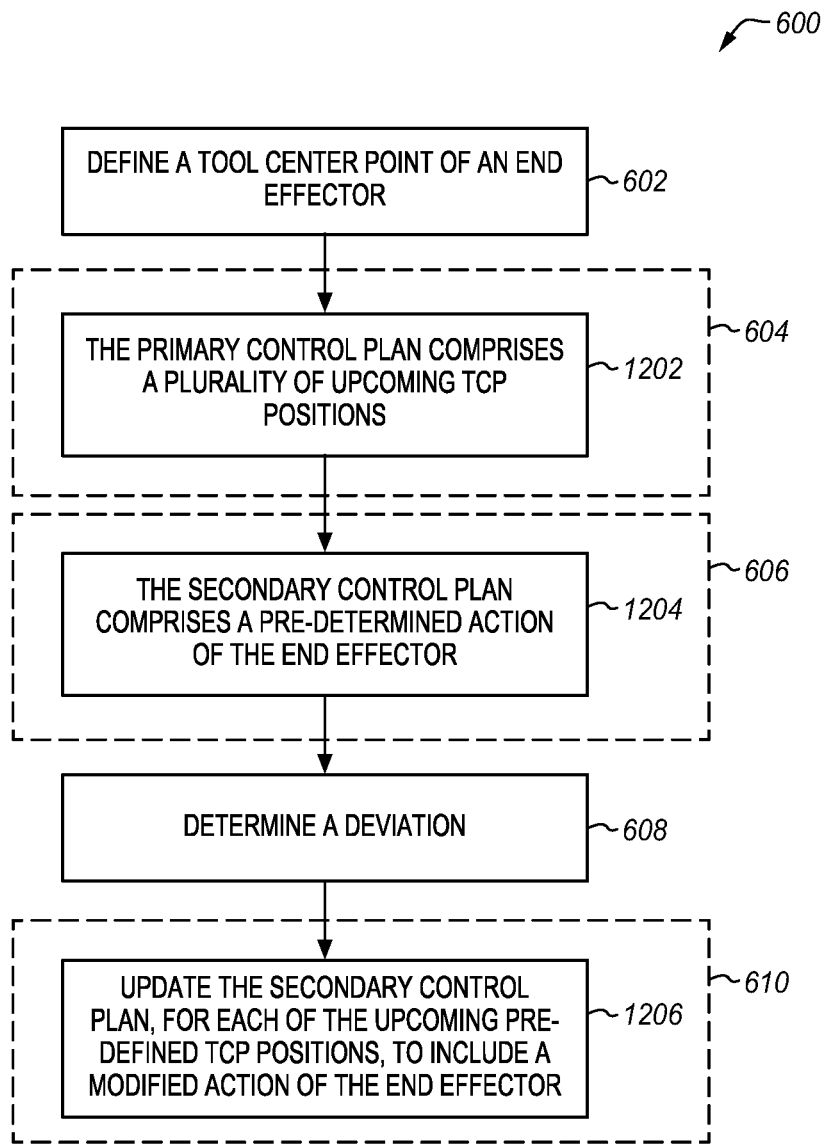
Figure 13:
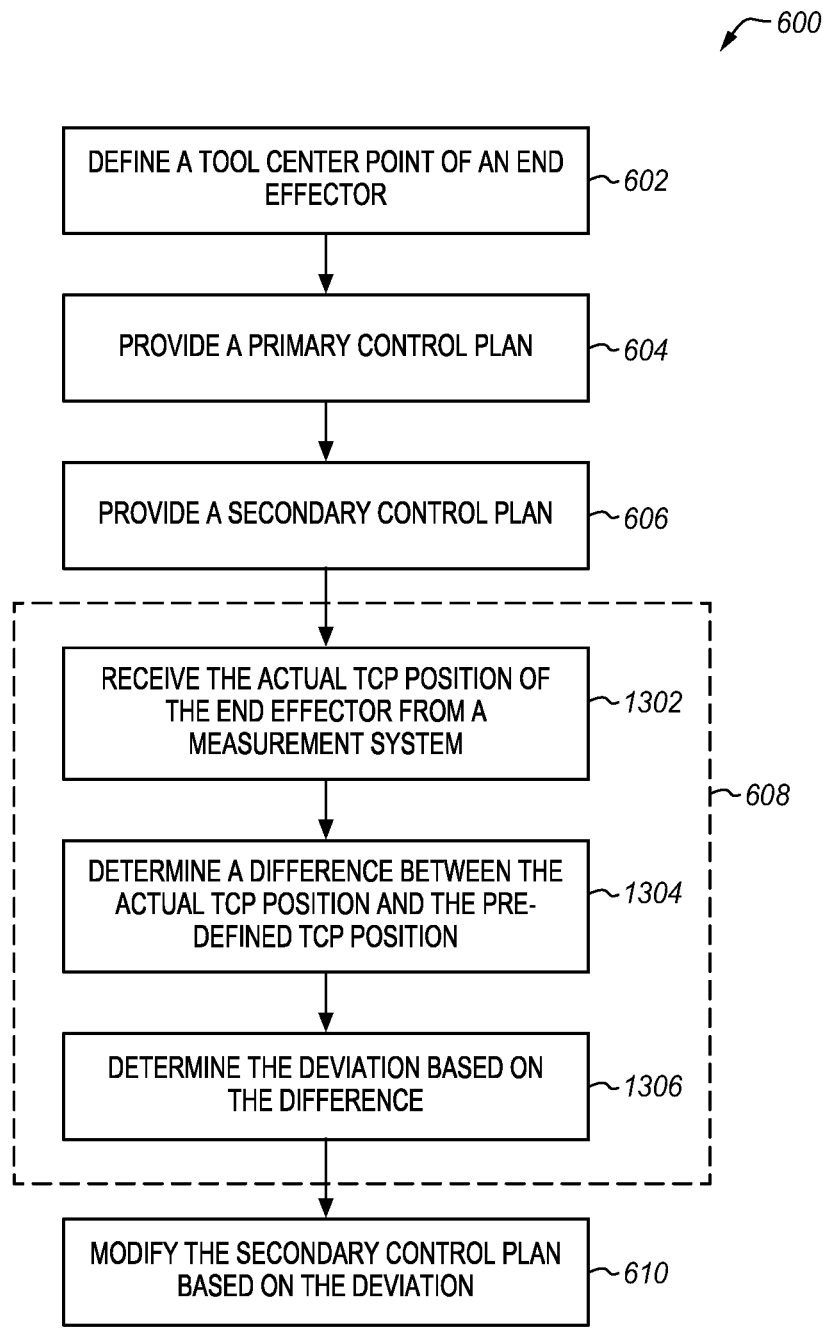

FIGS. 7C-7H depict end effector 316 at different orientations in illustrative embodiments. With respect to pre-determined TCP position 704 and actual TCP position 708, FIG. 7C depicts end effector 316 at an orientation 730, represented by a 3D vector $X_1$, $Y_1$, $Z_1$, and FIG. 7D depicts end effector 316 at an orientation 734 that is different than orientation 730, represented by a 3D vector $X_2$, $Y_2$, $Z_2$. Orientation 734 may be considered the different orientation of the modified secondary control plan. With respect to pre-determined TCP position 705 and actual TCP position 709, FIG. 7E depicts end effector 316 at an orientation 731, represented by a 3D vector $X_3$, $Y_3$, $Z_3$, and FIG. 7F depicts end effector 316 at an orientation 735 that is different than orientation 731, represented by a 3D vector $X_4$, $Y_4$, $Z_4$. Orientation 735 may be considered the different orientation of the modified secondary control plan. With respect to pre-determined TCP position 706 and actual TCP position 710, FIG. 7G depicts end effector 316 at an orientation 732, represented by a 3D vector $X_5$, $Y_5$, $Z_5$, and FIG. 7H depicts end effector 316 at an orientation 736 that is different than orientation 732, represented by a second 3D vector $X_6$, $Y_6$, $Z_6$. Orientation 736 may be considered the different orientation of the modified secondary control plan.

If secondary control plan 413 specifies orientation 730 (see FIG. 7C) for end effector 316 at pre-defined TCP position 704 (see step 1102 of FIG. 11) so as to result in work result 720 at work location 716 (see FIG. 7B), remaining in orientation 730 when end effector 316 is at actual TCP 708 can result in a work result at a different work location (e.g., a work location separated from work location 716 by a distance corresponding to the distance of the deviation 712). To account for the deviation 712 between pre-defined TCP position 704 and actual TCP 708, orientation 730 may be modified in secondary control plan 413 into orientation 734 based on deviation 712 (see step 1104, FIG. 7D). This modification in orientation as shown in FIG. 7D can result in end effector 316, operating from actual TCP 708, performing operations on workpiece 424 to result in work result 720 at work location 716 (see FIG. 7B).

The modifications to the orientation of end effector 316 in secondary control plan 413 may be independent of primary control plan 412, and provide a technical benefit of improving the accuracy of various processes that are based on the tools used.

In response to performing the tooling process when TCP 414 is at actual TCP position 708, robotic system 327 may continue executing primary control plan 412 that expects to move TCP 414 to subsequent pre-defined TCP positions 705-706 along tool path 702, with similar modifications to secondary control plan 413 performed in order to mitigate deviations 713-714 between actual TCP positions 709-710 and pre-defined TCP positions 705-706 along tool path 702.

Referring to FIG. 7B, tool path 702 includes a plurality of pre-defined TCP positions 704-706 associated with given work locations 716-718, which are desired locations on surface 426 of workpiece 424 where, for example, a drilling operation is to be performed. As discussed previously, actual TCP positions 708-710 represent TCP 414 of end effector 316 before compensation of the secondary control plan is performed. Without compensation, drill 402 would operate at actual TCP positions 708-710 at orientations 730, 731, and 732 (see FIGS. 7C, 7E, and 7G), which would cause drill 402 to result in work results (e.g., drilled holes) at locations different than given work locations 716-718. With compensation, however, the drill 402 can operate at actual TCP positions 708-710 and result in work results (e.g., drilled holes) at given work locations 716-718.

When the disclosed embodiment is implemented, primary control plan 412 may include a plurality of upcoming pre-defined TCP positions 704-706 (see step 1202 of FIG. 12), where for each of the upcoming pre-defined TCP positions 704-706 (i) the upcoming pre-defined TCP positions 704-706 and the upcoming actual TCP positions 708-710 are associated with given work locations 716-718 on workpiece 424, and (ii) secondary control plan 413 comprises a predetermined action of end effector 316, operating from the upcoming pre-defined TCP positions 704-06 (see step 1204), to result in work results 720-722 at the given work locations 716-718 (see step 1204)). In this embodiment, secondary control plan 413 may be updated, for each of the upcoming pre-defined TCP positions 704-706, to include a modified action of end effector 316, operating from the upcoming actual TCP positions 708-710, to result in the same work results 720-722 at the given work locations 716-718 (see step 1206). For example, the same work result may include drilling holes at given work locations 716-718 (e.g., using bit 416 of drill 402), painting an intended pattern at given work locations 716-718 (e.g., using nozzles 410 of print head(s) 408), performing a sawing operation at given work locations 716-718 (e.g., using blade 418 of saw 403), performing a sanding operation at given work locations 716-718 (e.g., using sanding pad 420 of sander 404), etc.

In some embodiments, robotic system 327 determines deviations 712-714 with the help of measurement system 301 (see FIG. 5). In these embodiments, controller 502 of robotic system 327 may receive actual TCP positions 708-710 of end effector 316 from measurement system 301 (see step 1302 of FIG. 13), determine a difference between actual TCP positions 708-710 and pre-defined TCP positions 704-706 (see step 1304), and determine deviations 712-714 based on the difference (see step 1306).

Figure 14:
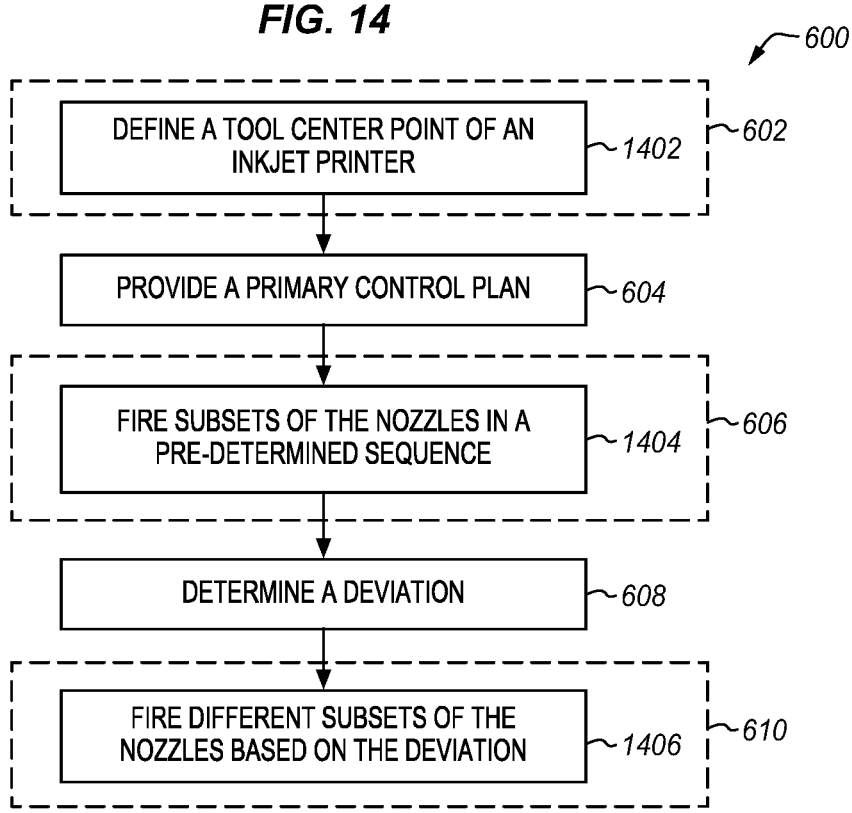
Figure 19:
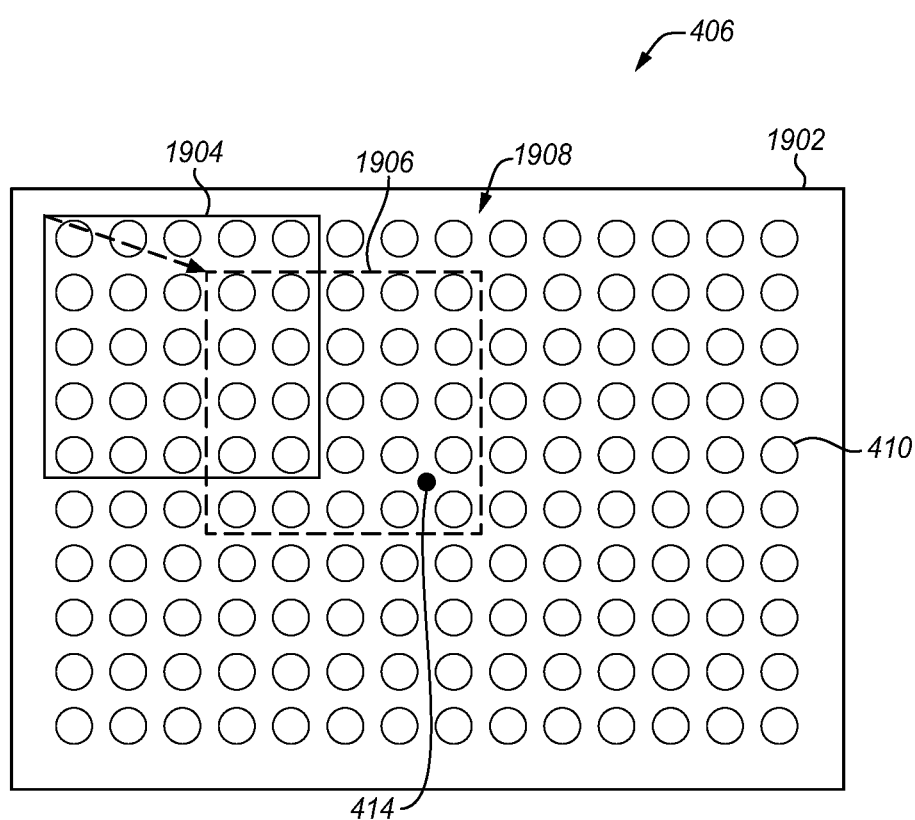
FIG. 19 is a front view of a planar array of nozzles for an inkjet printer in an exemplary embodiment.

When end effector 316 is inkjet printer 406 (see FIG. 4F), its nozzles 410 may be organized as a planar array with TCP 414 defined at a center of the planar array (see step 1402 of FIG. 14). FIG. 19 depicts a front view of a planar array 1902 of nozzles 410 in an illustrative embodiment.

As primary control plan 412 is executed by robotic system 327, robotic system 327 executes a sequence of TCP commands that expects to move TCP 414 of inkjet printer 406 along tool path 702 towards pre-defined TCP position 704. Deviation 712 between actual TCP position 708 and pre-defined TCP position 704 is used to modify secondary control plan 413. For example, if secondary control plan 413 specified the firing of a subset 1904 (see FIG. 19) of nozzles 410 in a pre-determined sequence (see step 1404 of FIG. 14), then modifying secondary control plan 413 may comprise firing a different subset 1906 of nozzles 410 (see FIG. 14) based on deviation 712 (see step 1406).

Since deviation 712 may generally be considered as an offset across a planar surface 1908 (see FIG. 19) of nozzles 410, deviation 712 may be used to calculate a shift in which nozzles 410 in planar array 1902 will eject colorants or some other type of print fluid. For example, if nozzles 410 are organized as a 400 Dots Per Inch (DPI) array, and deviation 712 is about ³⁄₄₀₀'s of an inch in a direction across the planar array, then robotic system 327 may modify secondary control plan 413 to shift which of nozzles 410 eject colorants or some other type of print fluid as a group (e.g., shifting from subset 1904 to subset 1906 as depicted in FIG. 19) in the direction by about three nozzle positions to compensate for deviation 712. In this painting application, the modification of secondary control plan 413 results in a more accurate paint result for aircraft 100, thereby providing a technical benefit of improving the painting process.

In response to performing the painting process when TCP 414 of inkjet printer 406 is located at actual TCP position 708, robotic system 327 may continue executing primary control plan 412 to move TCP 414 of inkjet printer 406 to actual TCP position 709, and modify secondary control plan 413 for inkjet printer 406 based on deviation 713. In like manner, robotic system 327 may continue executing primary control plan 412 to move TCP 414 of inkjet printer 406 to actual TCP position 710, and modify secondary control plan 413 for inkjet printer 406 based on deviation 714.

Figure 15:
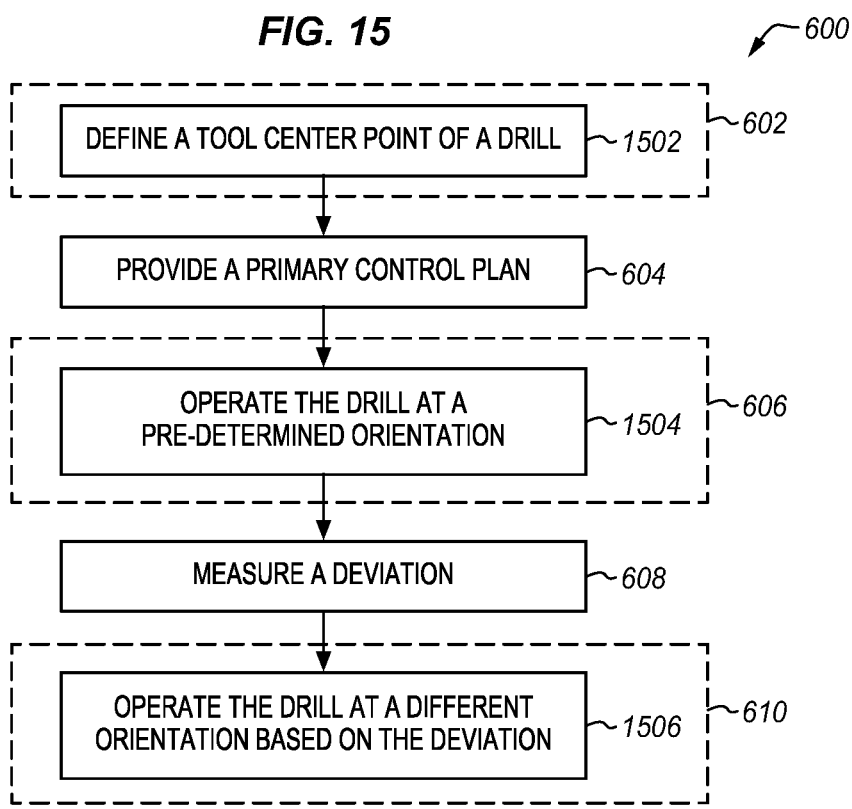

When end effector 316 is drill 402 (see FIG. 4B), TCP 414 of drill 402 may be defined as the center of drill bit 416 for drill 402 (see step 1502 of FIG. 15). As primary control plan 412 is executed by robotic system 327, robotic system 327 executes a sequence of TCP commands that expects to move TCP 414 of drill 402 along tool path 702 towards pre-defined TCP position 704, instead resulting in TCP 414 of drill 402 located at actual TCP position 708. Deviation 712 between actual TCP position 708 and pre-defined TCP position 704 is used to modify secondary control plan 413 for drill 402. If secondary control plan 413 specifies a pre-determined orientation for drill 402 (e.g., orientation 730 of FIG. 7C) for pre-defined TCP position 704 (see step 1504), then secondary control plan 413 may be modified to operate drill 402 at a different orientation (e.g., orientation 734 of FIG. 7D) based on deviation 712 (see step 1506). Some examples of operating drill 402 at a different orientation includes adjusting an angle of drill bit 416, a centerline of drill bit 416, etc. The modifications to the orientation of drill 402 may be independent of primary control plan 412, and provide a technical benefit of improving the accuracy of a drilling process.

In response to performing the drilling process when TCP 414 of drill 402 is located at actual TCP position 708, robotic system 327 may continue executing primary control plan 412 to move TCP 414 of drill 402 to actual TCP position 709, and modify secondary control plan 413 for drill 402 based on deviation 713. In like manner, robotic system 327 may continue executing primary control plan 412 to move TCP 414 of drill 402 to actual TCP position 710, and modify secondary control plan 413 for drill 402 based on deviation 714.

Figure 16:
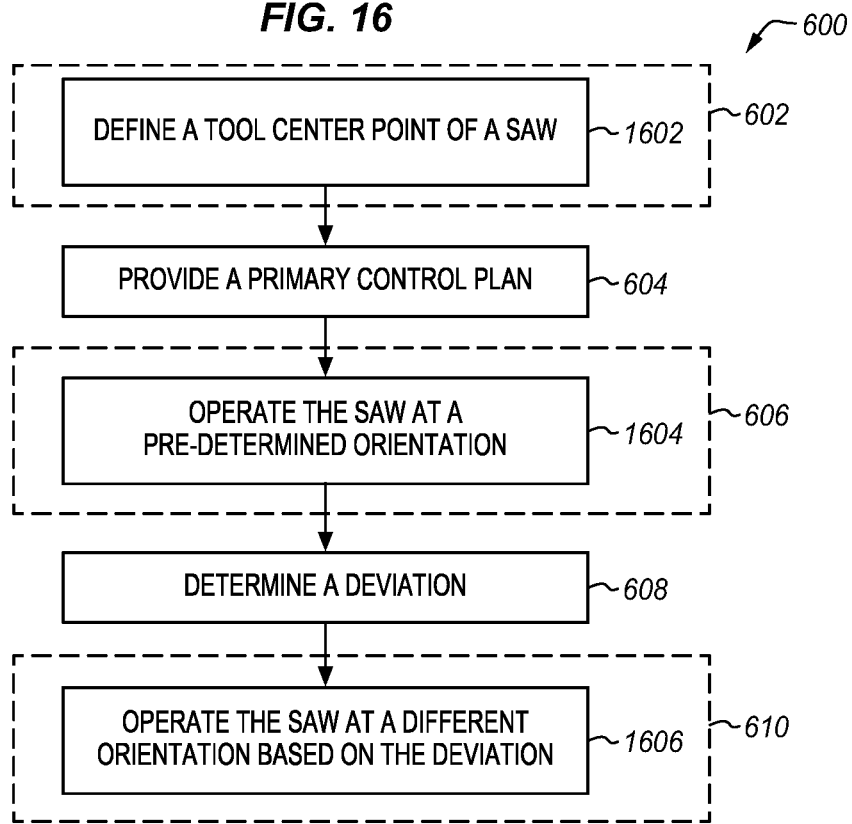

When end effector 316 is saw 403 (see FIG. 4C), TCP 414 of saw 403 may be defined as a tip of blade 418 of saw 403 that is proximate to workpiece 424 (see step 1602 of FIG. 16). As primary control plan 412 is executed by robotic system 327, robotic system 327 executes a sequence of TCP commands that expects to move TCP 414 of saw 403 along tool path 702 towards pre-defined TCP position 704, instead resulting in TCP 414 of saw 403 being located at actual TCP position 708. Deviation 712 between actual TCP position 708 and pre-defined TCP position 704 is used to modify secondary control plan 413 for saw 403. If secondary control plan 413 specifies a pre-determined orientation for saw 403 (e.g., orientation 730 of FIG. 7C) for pre-defined TCP position 704 (see step 1604), then secondary control plan 413 may be modified to operate saw 403 at a different orientation (e.g., orientation 731 of FIG. 7D) based on deviation 712 (see step 1606). Some examples of operating saw 403 at a different orientation includes adjusting an angle of blade 418, a centerline of blade 418, etc. The modifications to the orientation of saw 403 may be independent of primary control plan 412, and provide a technical benefit of improving the accuracy of a cutting process.

In response to performing the cutting process when TCP 414 of saw 403 is located at actual TCP position 708, robotic system 327 may continue executing primary control plan 412 to move TCP 414 of saw 403 to actual TCP position 709, and modify secondary control plan 413 for saw 403 based on deviation 713. In like manner, robotic system 327 may continue executing primary control plan 412 to move TCP 414 of saw 403 to actual TCP position 710, and modify secondary control plan 413 for saw 403 based on deviation 714.

Figure 17:
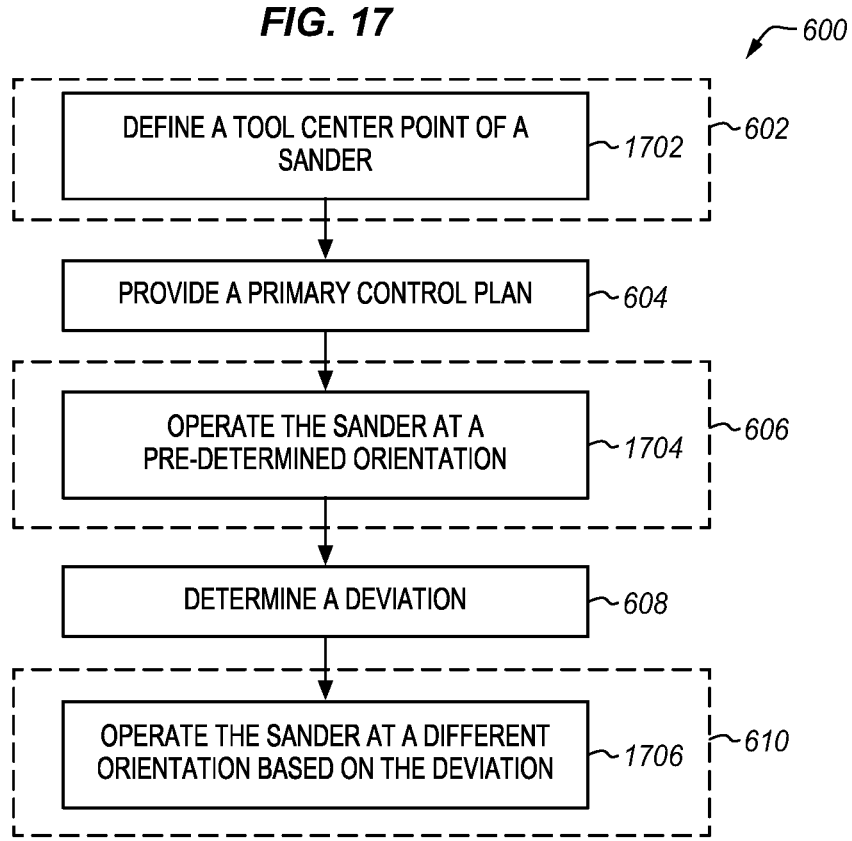

When end effector 316 is sander 404 (see FIG. 4D), TCP 414 of sander 404 may be defined as the center of sanding pad 420 (see step 1702 of FIG. 17). As primary control plan 412 is executed by robotic system 327, robotic system 327 executes a sequence of TCP commands that expects to move TCP 414 of sander 404 along tool path 702 towards pre-defined TCP position 704, instead resulting in TCP 414 of sander 404 being located at actual TCP position 708. Deviation 712 between actual TCP position 708 and pre-defined TCP position 704 is used to modify secondary control plan 413 for sander 404. If secondary control plan 413 specified a pre-determined orientation for sander 404 (e.g., orientation 730 of FIG. 7C) for pre-defined TCP position 704 (see step 1704), then secondary control plan 413 may be modified to operate sander 404 at a different orientation (e.g., orientation 731 of FIG. 7D) based on deviation 712 (see step 1706). Some examples of operating sander 404 at a different orientation includes adjusting an angle of sanding pad 420, a centerline of sanding pad 420, etc. The modifications to the orientation of sander 404 may be independent of primary control plan 412, and provide a technical benefit of improving the accuracy of a sanding process.

In response to performing the sanding process when TCP 414 of sander 404 is located at actual TCP position 708, robotic system 327 may continue executing primary control plan 412 to move TCP 414 of sander 404 to actual TCP position 709, and modify secondary control plan 413 for sander 404 based on deviation 713. In like manner, robotic system 327 may continue executing primary control plan 412 to move TCP 414 of sander 404 to actual TCP position 710, and modify secondary control plan 413 for sander 404 based on deviation 714.

Figure 18:
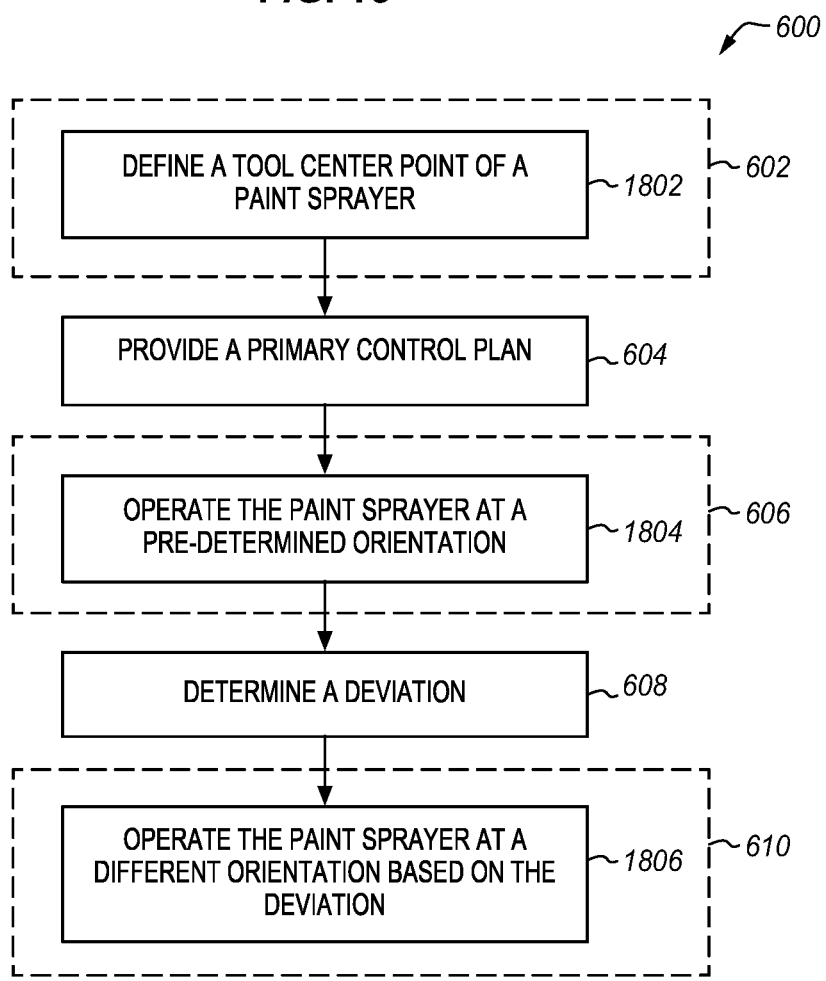

When end effector 316 is paint sprayer 405 (see FIG. 4E), TCP 414 of paint sprayer 405 may be defined as spray tip 422 of paint sprayer 405 (see step 1802 of FIG. 18). As primary control plan 412 is executed by robotic system 327, robotic system 327 executes a sequence of TCP commands that expects to move TCP 414 of paint sprayer 405 along tool path 702 towards pre-defined TCP position 704, instead resulting in TCP 414 of paint sprayer 405 being located at actual TCP position 708. Deviation 712 between actual TCP position 708 and pre-defined TCP position 704 is used to modify secondary control plan 413 for paint sprayer 405. If secondary control plan 413 specifies a pre-determined orientation for paint sprayer 405 (e.g., orientation 730 of FIG. 7C) for pre-defined TCP position 704 (see step 1804), then secondary control plan 413 may be modified to operate paint sprayer 405 at a different orientation (e.g., orientation 731 of FIG. 7D) based on deviation 712 (see step 1806). Some examples of operating paint sprayer 405 at a different orientation includes adjusting an angle of spray tip 422, a centerline of spray tip 422, etc. The modifications to the orientation of paint sprayer 405 may be independent of primary control plan 412, and provide a technical benefit of improving the accuracy of a painting process.

In response to performing the painting process when TCP 414 of paint sprayer 405 is located at actual TCP position 708, robotic system 327 may continue executing primary control plan 412 to move TCP 414 of paint sprayer 405 to actual TCP position 709, and modify secondary control plan 413 for paint sprayer 405 based on deviation 713. In like manner, robotic system 327 may continue executing primary control plan 412 to move TCP 414 of paint sprayer 405 to actual TCP position 710, and modify secondary control plan 413 for paint sprayer 405 based on deviation 714.

Figure 20:
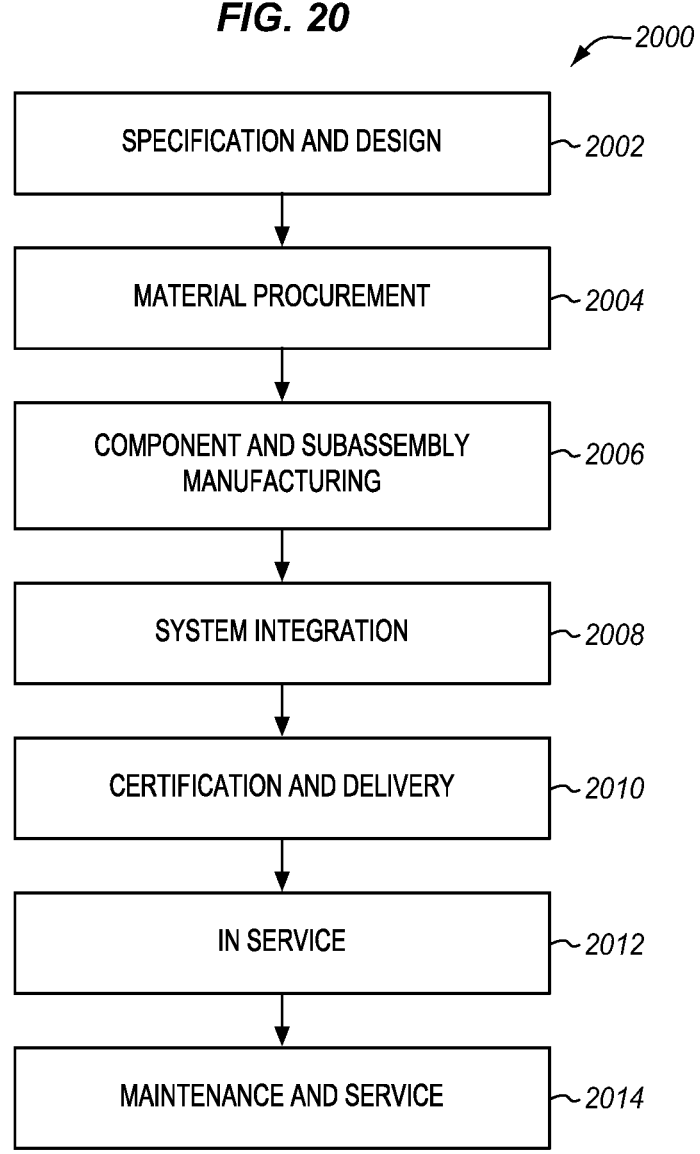
FIG. 20 is a flow chart illustrating an aircraft manufacturing and service method in an illustrative embodiment.
Figure 21:
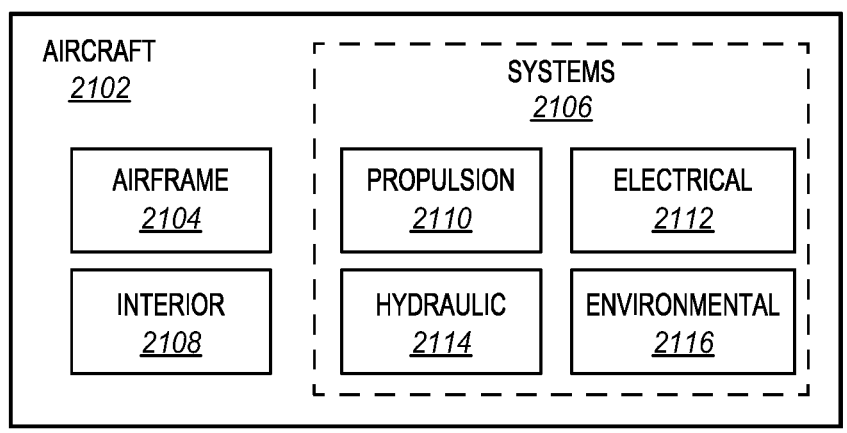
FIG. 21 is a schematic diagram of an aircraft in an illustrative embodiment.

The embodiments of the disclosure may be described in the context of an aircraft manufacturing and service method 2000 as shown in FIG. 20 and an aircraft 2102 as shown in FIG. 21. During pre-production, exemplary method 2000 may include a specification and design 2002 of aircraft 2102, and material procurement 2004. During production, component and subassembly manufacturing 2006 and system integration 2008 of aircraft 2102 takes place. Thereafter, aircraft 2102 may go through certification and delivery 2010 in order to be placed in service 2012. While in service by a customer, aircraft 2102 is scheduled for routine maintenance and service 2014 (which may also include modification, reconfiguration, refurbishment, and so on).

Each of the processes of method 2000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 21, aircraft 2102 produced by exemplary method 2000 may include an airframe 2104 with a plurality of systems 2106 and an interior 2108. Examples of high-level systems 2106 include one or more of propulsion systems 2110, an electrical system 2112, a hydraulic system 2114, and an environmental system 2116. Any number of other systems may be included. Although an aerospace example is shown, the principles described in this specification may be applied to other industries, such as the automotive industry.

Apparatus and methods embodied herein may be employed during any one or more of the stages of the production and service method 2000. For example, components or subassemblies corresponding to component and subassembly manufacturing 2006 may be fabricated or manufactured in a manner similar to components or subassemblies produced while aircraft 2102 is in service. Also, one or more apparatus embodiments, method embodiments, or a combination thereof may be utilized during the component subassembly and manufacturing 2006 and system integration 2008, for example, by substantially expediting assembly of or reducing the cost of aircraft 2102. Similarly, one or more of apparatus embodiments, method embodiments, or a combination thereof may be utilized while aircraft 2102 is in service, for example and without limitation, to maintenance and service 2014.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A method of operating a robotic system, the method comprising:
    defining a Tool Center Point (TCP) for an end effector of the robotic system, wherein the end effector comprises a print head having a plurality of nozzles;
    providing a primary control plan that defines a tool path for the end effector having a plurality of pre-defined TCP positions;
    providing a secondary control plan that defines operation of the end effector at each of the plurality of pre-defined TCP positions, wherein the secondary control plan comprises firing a subset of the plurality of nozzles in a pre-determined sequence at each pre-defined TCP position of the print head;
    determining a deviation between a pre-defined TCP position of the end effector and an actual TCP position of the end effector during implementation of the primary control plan by the robotic system; and
    modifying the secondary control plan for the end effector, without modifying the primary control plan, based on the deviation during the implementation of the primary control plan by the robotic system, wherein modifying the secondary control plan comprises firing a different subset of the nozzles at the actual TCP position of the print head based on the deviation.

2. The method of claim 1, further comprising:
    operating the end effector according to the modified secondary control plan.

3. The method of claim 2, wherein:
    operating the end effector according to the modified secondary control plan occurs while continuing to operate the robotic system according to the primary control plan.

4. The method of claim 1, further comprising:
    modifying the primary control plan based on the deviation.

5. The method of claim 1, wherein:
    the secondary control plan comprises operating the end effector at a pre-determined orientation at the pre-defined TCP position of the end effector, and
    modifying the secondary control plan comprises operating the end effector at a different orientation at the actual TCP position of the end effector based on the deviation.

6. The method of claim 1, wherein:
    the primary control plan comprises a plurality of upcoming pre-defined TCP positions, and for each of the upcoming pre-defined TCP positions (i) the upcoming pre-defined TCP position and an upcoming actual TCP position are associated with a given work location on a workpiece and (ii) the secondary control plan comprises a predetermined action of the end effector, operating from the upcoming pre-defined TCP position, to result in a work result at the given work location, and
    modifying the secondary control plan comprises updating the secondary control plan, for each of the upcoming pre-defined TCP positions, to include a modified action of the end effector, operating from the upcoming actual TCP position, to result in a same work result at the given work location.

7. The method of claim 1, wherein determining the deviation comprises:
    receiving the actual TCP position of the end effector from a measurement system in a manufacturing environment in which the robotic system operates;
    determining a difference between the actual TCP position as measured and the pre-defined TCP position specified in the primary control plan; and
    determining the deviation based on the difference.

8. The method of claim 1 wherein the print head comprises a print head in an ink jet printer.

9. A robotic system, comprising:
    an end effector having a Tool Center Point (TCP), wherein the end effector comprises a print head having a plurality of nozzles; and at least one controller configured to implement a primary control plan that defines a tool path for the end effector, wherein the tool path includes a plurality of pre-defined TCP positions, wherein the at least one controller is configured to implement a secondary control plan that defines operation of the end effector at each of the plurality of pre-defined TCP positions, wherein the secondary control plan comprises firing a subset of the plurality of nozzles in a pre-determined sequence at each pre-defined TCP position of the print head, wherein the at least one controller is configured to determine a deviation between a pre-defined TCP position of the end effector and an actual TCP position of the end effector during implementation of the primary control plan by the robotic system, and to modify the secondary control plan for the end effector, without modifying the primary control plan, based on the deviation during the implementation of the primary control plan by the robotic system, wherein modifying the secondary control plan comprises firing a different subset of the nozzles at the actual TCP position of the print head based on the deviation.

10. The robotic system of claim 9, wherein:
the at least one controller is configured to operate the end effector according to the modified secondary control plan.

11. The robotic system of claim 10, wherein:
the at least one controller is configured to operate the end effector according to the modified secondary control plan while continuing to operate the robotic system according to the primary control plan.

12. The robotic system of claim 9, wherein:
the at least one controller is configured to modify the primary control plan based on the deviation.

13. The robotic system of claim 9, wherein:
the secondary control plan comprises operating the end effector at a pre-determined orientation at the pre-defined TCP position of the end effector, and
the at least one controller is configured to modify the secondary control plan to operate the end effector at a different orientation at the actual TCP position of the end effector based on the deviation.

14. The robotic system of claim 9, wherein:
the primary control plan comprises a plurality of upcoming pre-defined TCP positions, and for each of the upcoming pre-defined TCP positions (i) the upcoming pre-defined TCP position and an upcoming actual TCP position are associated with a given work location on a workpiece and (ii) the secondary control plan comprises a predetermined action of the end effector, operating from the upcoming pre-defined TCP position, to result in a work result at the given work location, and
the at least one controller is configured to update the secondary control plan, for each of the upcoming pre-defined TCP positions, to include a modified action of the end effector, operating from the upcoming actual TCP position, to result in a same work result at the given work location.

15. The robotic system of claim 9, wherein:
the at least one controller is configured to receive the actual TCP position of the end effector from a measurement system in a manufacturing environment in which the robotic system operates, to determine a difference between the actual TCP position as measured and the pre-defined TCP position specified in the primary control plan, and to determine the deviation based on the difference.

16. The robotic system of claim 9 wherein the print head comprises a print head in an ink jet printer.

17. A non-transitory computer-readable medium embodying programmed instructions which, when executed by at least one processor of a robotic system, directs the at least one processor to:
define a Tool Center Point (TCP) for an end effector of the robotic system, wherein the end effector comprises a print head having a plurality of nozzles;
provide a primary control plan that defines a tool path for the end effector having a plurality of pre-defined TCP positions;
provide a secondary control plan that defines operation of the end effector at each of the plurality of pre-defined TCP positions, wherein the secondary control plan comprises firing a subset of the plurality of nozzles in a pre-determined sequence at each pre-defined TCP position of the print head;
determine a deviation between a pre-defined TCP position of the end effector and an actual TCP position of the end effector during implementation of the primary control plan by the robotic system; and
modify the secondary control plan for the end effector, without modifying the primary control plan, based on the deviation during the implementation of the primary control plan by the robotic system, wherein modifying the secondary control plan comprises firing a different subset of the nozzles at the actual TCP position of the print head based on the deviation.

18. The non-transitory computer-readable medium of claim 17, wherein the programmed instructions further direct the at least one processor to:
operate the end effector according to the modified secondary control plan.

19. The non-transitory computer-readable medium of claim 18, wherein the programmed instructions further direct the at least one processor to:
operate the end effector according to the modified secondary control plan occurs while continuing to operate the robotic system according to the primary control plan.

20. The non-transitory computer-readable medium of claim 17, wherein the programmed instructions further direct the at least one processor to:
modify the primary control plan based on the deviation.

21. The non-transitory computer-readable medium of claim 17, wherein:
the secondary control plan comprises operating the end effector at a pre-determined orientation at the pre-defined TCP position of the end effector, and
the programmed instructions further direct the at least one processor to operate the end effector at a different orientation at the actual TCP position of the end effector based on the deviation.

22. The non-transitory computer-readable medium of claim 17, wherein:
the primary control plan comprises a plurality of upcoming pre-defined TCP positions, and for each of the upcoming pre-defined TCP positions (i) the upcoming pre-defined TCP position and an upcoming actual TCP position are associated with a given work location on a workpiece and (ii) the secondary control plan comprises a predetermined action of the end effector, operating from the upcoming pre-defined TCP position, to result in a work result at the given work location, and the programmed instructions further direct the at least one processor to update the secondary control plan, for each of the upcoming pre-defined TCP positions, to include a modified action of the end effector, operating from the upcoming actual TCP position, to result in a same work result at the given work location.

23. The non-transitory computer-readable medium of claim 17 wherein the print head comprises a print head in an ink jet printer.

\* \* \* \* \*